US012300938B2

(12) United States Patent
Horino et al.

(10) Patent No.: US 12,300,938 B2
(45) Date of Patent: May 13, 2025

(54) CONNECTOR AND ELECTRONIC APPARATUS

(71) Applicant: KYOCERA CORPORATION, Kyoto (JP)

(72) Inventors: Shintaro Horino, Yokohama (JP); Masayoshi Kakino, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 404 days.

(21) Appl. No.: 17/782,567

(22) PCT Filed: Dec. 21, 2020

(86) PCT No.: PCT/JP2020/047761
§ 371 (c)(1),
(2) Date: Jun. 3, 2022

(87) PCT Pub. No.: WO2021/132188
PCT Pub. Date: Jul. 1, 2021

(65) Prior Publication Data

US 2023/0008789 A1 Jan. 12, 2023

(30) Foreign Application Priority Data

Dec. 25, 2019 (JP) ................................ 2019-235165

(51) Int. Cl.

| | |
|---|---|
| ***H01R 13/658*** | (2011.01) |
| ***H01R 12/71*** | (2011.01) |
| ***H01R 13/40*** | (2006.01) |
| ***H01R 13/516*** | (2006.01) |
| ***H01R 13/6582*** | (2011.01) |
| ***H01R 24/60*** | (2011.01) |

(52) U.S. Cl.
CPC ....... *H01R 13/6582* (2013.01); *H01R 12/716* (2013.01); *H01R 13/40* (2013.01); *H01R 13/516* (2013.01); *H01R 24/60* (2013.01)

(58) Field of Classification Search
None
See application file for complete search history.

(56) References Cited

U.S. PATENT DOCUMENTS

| | | | | |
|---|---|---|---|---|
| 7,059,908 | B2 | 6/2006 | Yamaguchi | |
| 10,897,097 | B2 | 1/2021 | Hirakawa | |
| 11,509,083 | B2 * | 11/2022 | Lee ...................... | G06F 1/1626 |
| 2015/0270641 | A1 | 9/2015 | Omodachi et al. | |

FOREIGN PATENT DOCUMENTS

| | | | |
|---|---|---|---|
| JP | 2013041771 | A | 2/2013 |
| JP | 2019087382 | A | 6/2019 |
| KR | 20060049877 | A | 5/2006 |

* cited by examiner

*Primary Examiner* — Ross N Gushi
(74) *Attorney, Agent, or Firm* — Duane Morris LLP

(57) ABSTRACT

A connector (1) includes: a first connector (10) including a first contact (30*a*) attached to a first insulator (20); a second connector (50) including a second contact (70*a*) attached to a second insulator (60); and a shield member attached to the first insulator (20) and the second insulator (60). The shield member includes a first base portion (41), and a first extending portion (42) that extends from the first base portion (41) along a fitting direction and that is disposed on each of two sides in a first direction with respect to a contact part between the first contact (30*a*) and the second contact (70*a*) in a fitted state, the first direction being perpendicular to the fitting direction.

6 Claims, 16 Drawing Sheets

1

CONNECTOR AND ELECTRONIC APPARATUS

CROSS-REFERENCE TO RELATED APPLICATIONS

The present application claims priority of Japanese Patent Application No. 2019-235165, filed in Japan Patent Office on Dec. 25, 2019, the entire contents of the disclosure of which are incorporated herein for reference.

TECHNICAL FIELD

The present disclosure relates to a connector and an electronic apparatus.

BACKGROUND ART

In recent years, regarding electronic apparatuses, increase in communication speed and increase in information amount have considerably progressed. Since high frequency bands are used in communication systems in recent years, in order to obtain good transmission characteristics, it is also required for a connector to have a shielding structure that can obtain a noise shielding effect and a design in which crosstalk, impedance matching, and the like for high-frequency signals are appropriately considered.

PTL 1 discloses an electric connector device that enables reduction in size of a connector in the width direction in a structure in which a shield shell is disposed at a position outside of a contact member.

CITATION LIST

Patent Literature

PTL 1: Japanese Unexamined Patent Application Publication No. 2019-087382

SUMMARY OF INVENTION

A connector according to one embodiment of the present disclosure includes:

a first connector including a first insulator and a first contact that is attached to the first insulator;

a second connector including a second insulator that is fittable to the first insulator, and a second contact that is attached to the second insulator and that is in contact with the first contact in a fitted state in which the first insulator and the second insulator are fitted to each other; and a shield member that is attached to the first insulator and the second insulator.

The shield member includes a first base portion, and a first extending portion that extends from the first base portion along a fitting direction in which the first insulator and the second insulator are fitted to each other and that is disposed on each of two sides, in a first direction, with respect to a contact part between the first contact and the second contact in the fitted state, the first direction being perpendicular to the fitting direction.

An electronic apparatus according to one embodiment of the present disclosure includes the connector.

DESCRIPTION OF EMBODIMENTS

The electrical connector device described in PTL 1, although having a shielding structure that can obtain a noise shielding effect, does not have a sufficient connector design for obtaining good transmission characteristics for high-frequency signals.

With a connector and an electronic apparatus according to one embodiment of the present disclosure, it is possible to obtain good transmission characteristics for high-frequency signals.

Hereafter, one embodiment of the present disclosure will be described in detail with reference to the drawings. The front-back direction, the left-right direction, and the up-down direction in the following description are based on the directions of arrows in the figures. The directions of arrows in FIGS. 1, 2, and 8 to 17 are consistent with each other between different figures. The directions of arrows in FIGS. 3 to 7 are consistent with each other between different figures. In some figures, illustrations of circuit boards CB1 and CB2 (described below) are omitted for the purpose of simplicity of illustration.

Figure 1:
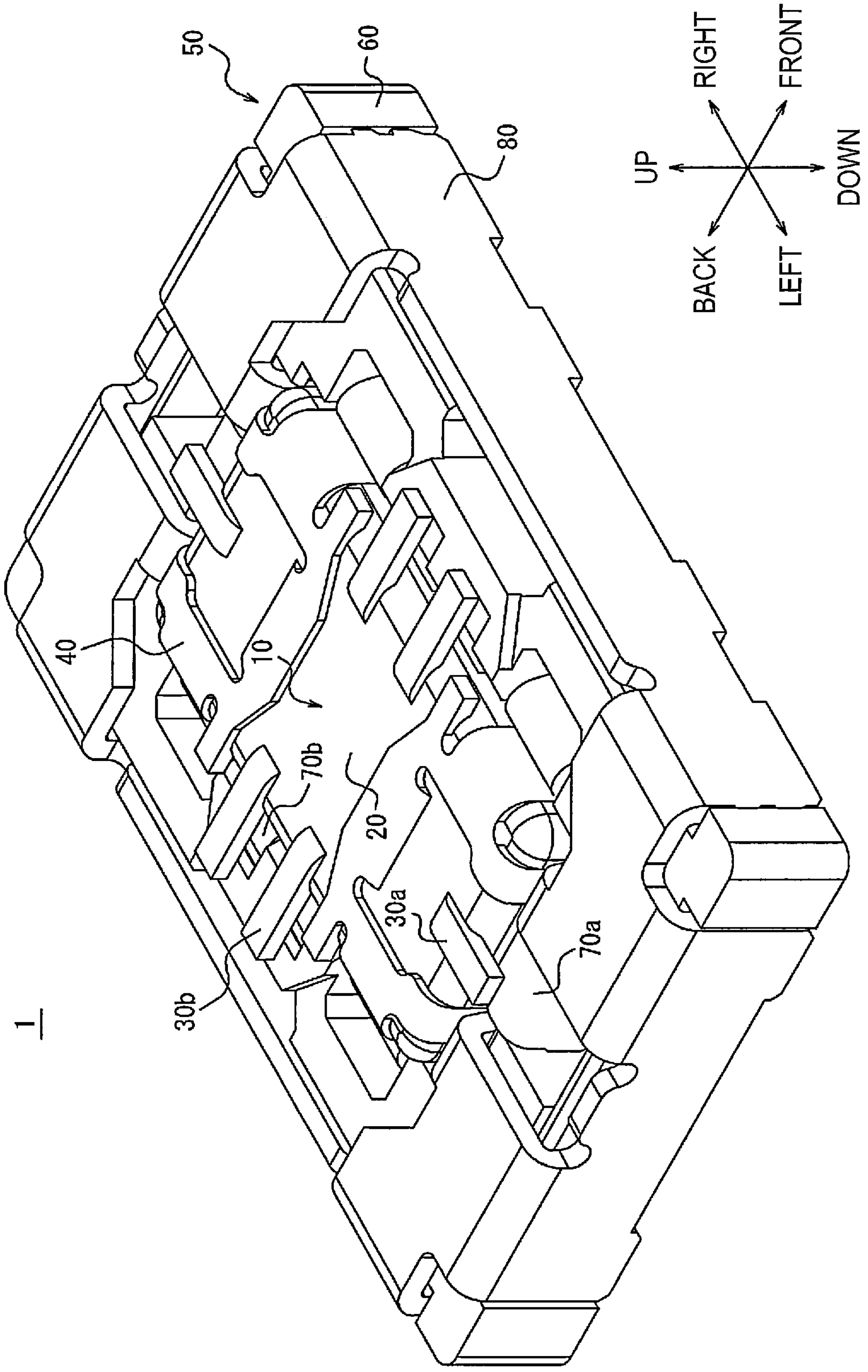
FIG. 1 is an external top perspective view of a connector according to one embodiment in a state in which a first connector and a second connector are connected to each other.
Figure 2:
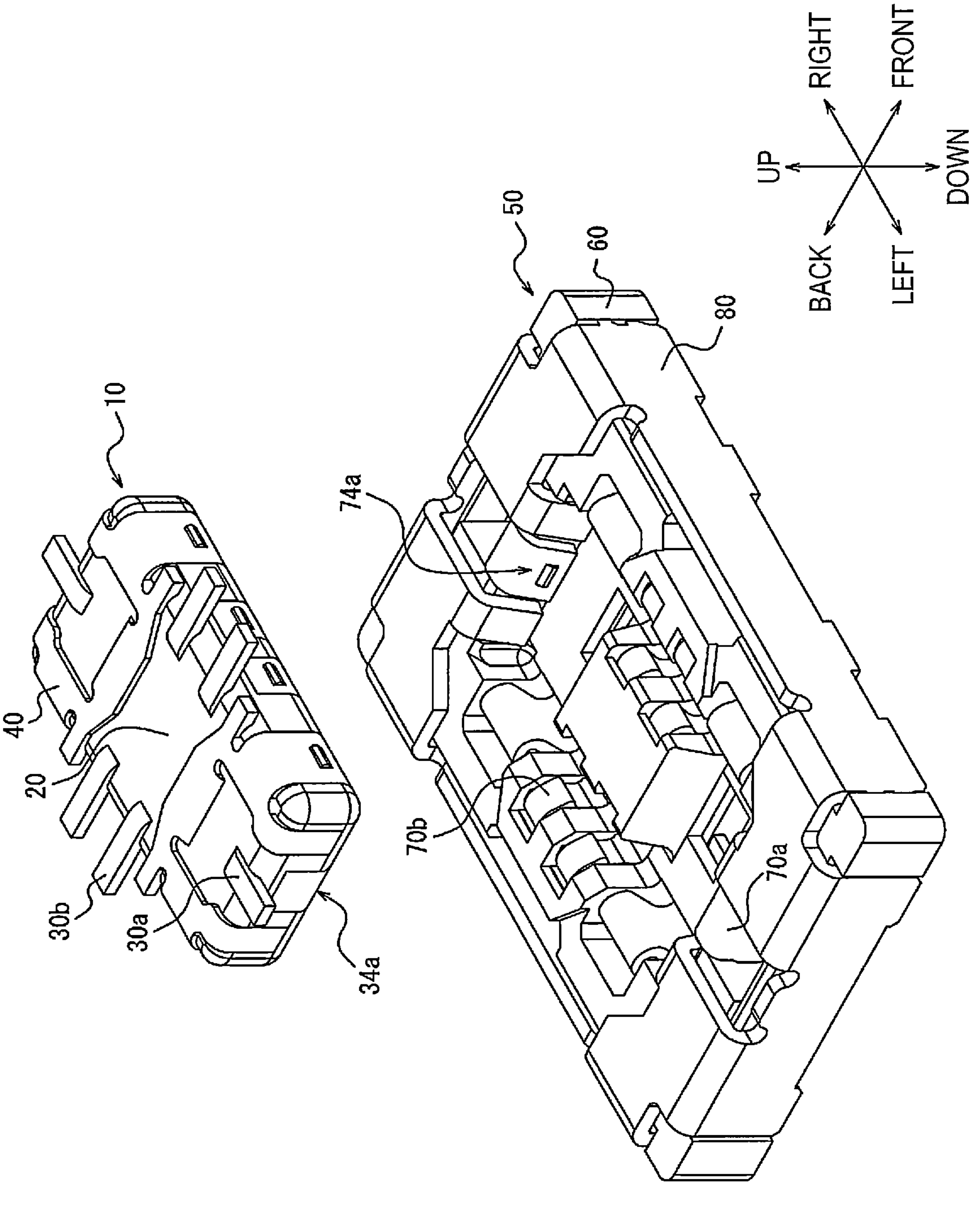
FIG. 2 is an external top perspective view of the connector according to one embodiment in a state in which the first connector and the second connector are separated from each other.

FIG. 1 is an external top perspective view of a connector 1 according to one embodiment in a state in which a first connector 10 and a second connector 50 are connected to each other. FIG. 2 is an external top perspective view of the connector 1 according to one embodiment in a state in which the first connector 10 and the second connector 50 are separated from each other.

For example, as illustrated in FIG. 2, the connector 1 includes the first connector 10 and the second connector 50 that can be connected to each other. The first connector 10 includes a first insulator 20, and a first contacts 30*a* that includes a first contacting portion 34*a* described below and that is attached to the first insulator 20. The first connector 10 includes a signal contact 30*b* and a first shield member 40 that are attached to the first insulator 20.

The second connector 50 includes a second insulator 60 that is fittable to the first insulator 20. The second connector 50 includes a second contact 70*a* that includes a second contacting portion 74*a* (described below) and that is attached to the second insulator 60, the second contacting portion 74*a* being in contact with the first contacting portion 34*a* in a fitted state in which the first insulator 20 and the second insulator 60 are fitted to each other. The second connector 50 includes a signal contact 70*b* and a second shield member 80 that are attached to the second insulator 60.

As described above, a shield member of the connector 1 is attached to the first insulator 20 and the second insulator 60. To be more specific, the shield member includes the first shield member 40 attached to the first insulator 20 and the second shield member 80 attached to the second insulator 60.

In the following description, it is assumed that, for example, the second connector 50 according to one embodiment is a receptacle connector. In the following description, it is assumed that the first connector 10 is a plug connector. In the following description, it is assumed that the second connector 50, in which the second contact 70*a* and the signal contact 70*b* are elastically deformed in the fitted state in which the first insulator 20 and the second insulator 60 are fitted to each other, is a receptacle connector. In the following description, it is assumed that the first connector 10, in which the first contact 30*a* and the signal contact 30*b* do not elastically deform, is a plug connector. The types of the first connector 10 and the second connector 50 are not limited to these. For example, the second connector 50 may serve as a plug connector, and the first connector 10 may serve as a receptacle connector.

In the following description, it is assumed that the first connector 10 and the second connector 50 are to be mounted respectively on the circuit boards CB1 and CB2. In a state of being connected to each other, the first connector 10 and the second connector 50 electrically connect the circuit board CB1 and the circuit board CB2. The circuit boards CB1 and CB2 may be rigid boards, or may be any circuit boards other than rigid boards. For example, at least one of the circuit boards CB1 and CB2 may be a flexible printed circuit board.

In the following description, it is assumed that the first connector 10 and the second connector 50 are connected to each other in a direction that is perpendicular to the circuit boards CB1 and CB2. The first connector 10 and the second connector 50 are connected to each other, for example, along the up-down direction. The connection method is not limited to this. The first connector 10 and the second connector 50 may be connected to each other in a direction parallel to the circuit boards CB1 and CB2. The first connector 10 and the second connector 50 may be connected to each other so that one of these is perpendicular to a circuit board to which the one is mounted and the other is parallel to a circuit board to which the other is mounted.

The "fitting direction" described in the claims corresponds to, for example, the up-down direction in the present specification. Likewise, the "first direction that is perpendicular to a fitting direction" corresponds to, for example, the front-back direction. The "transversal direction of the connector 1" corresponds to, for example, the front-back direction. The "second direction that is perpendicular to first direction and the fitting direction" corresponds to, for example, the, left-right direction. The "longitudinal direction of the connector 1" corresponds to, for example, the left-right direction.

The connector 1 according to one embodiment includes two pairs of the first contacts 30*a* and the second contacts 70*a* that are in contact with each other in a state in which the first connector 10 and the second connector 50 are connected. The connector 1 has a shield structure that shields each pair of the first contact 30*a* and the second contacts 70*a* that are in contact with each other in a fitted state in which the first insulator 20 and the second insulator 60 are fitted to each other.

Figure 3:
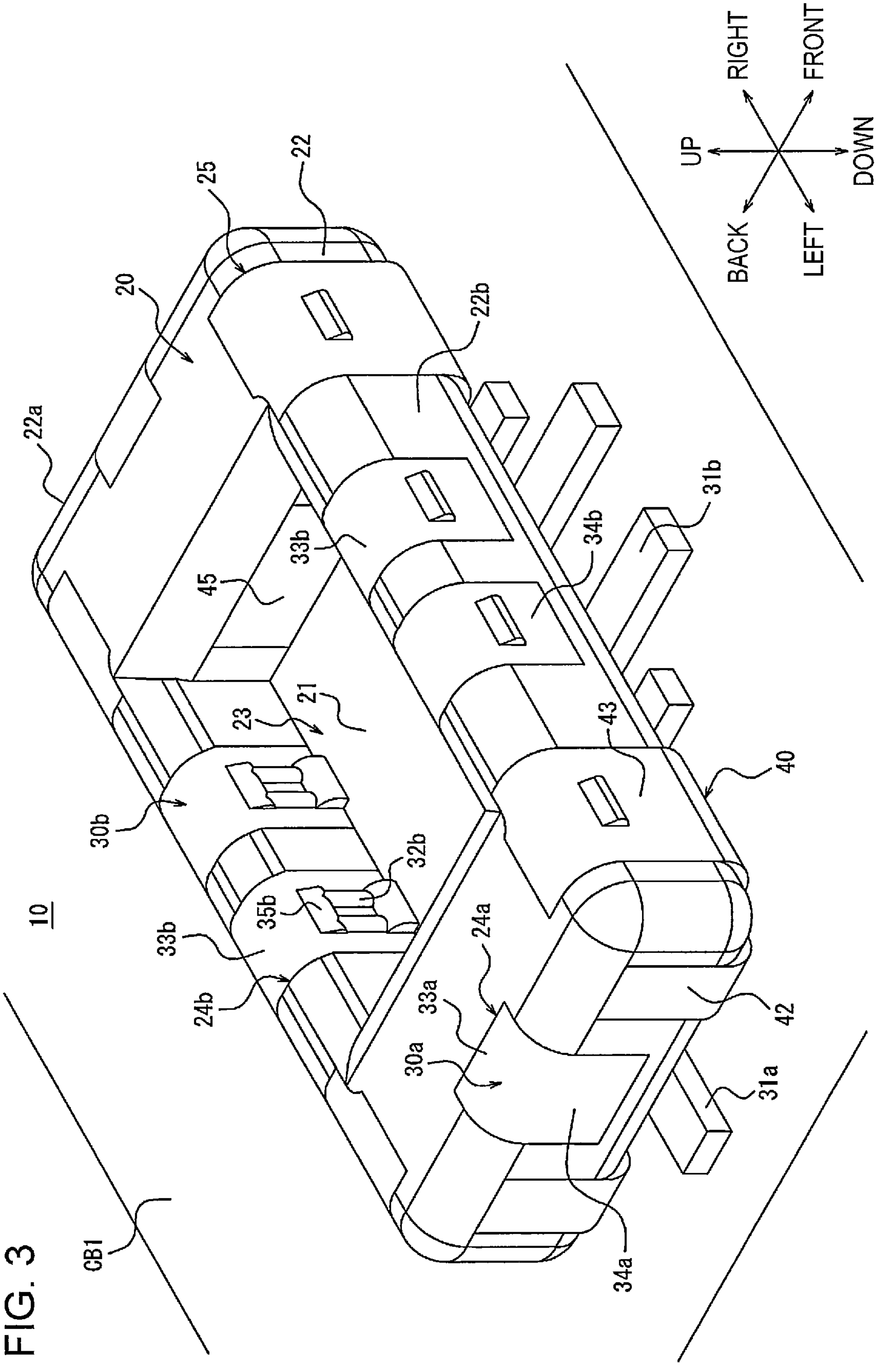
FIG. 3 is an external top perspective view illustrating only the first connector of FIG. 1.
Figure 4:
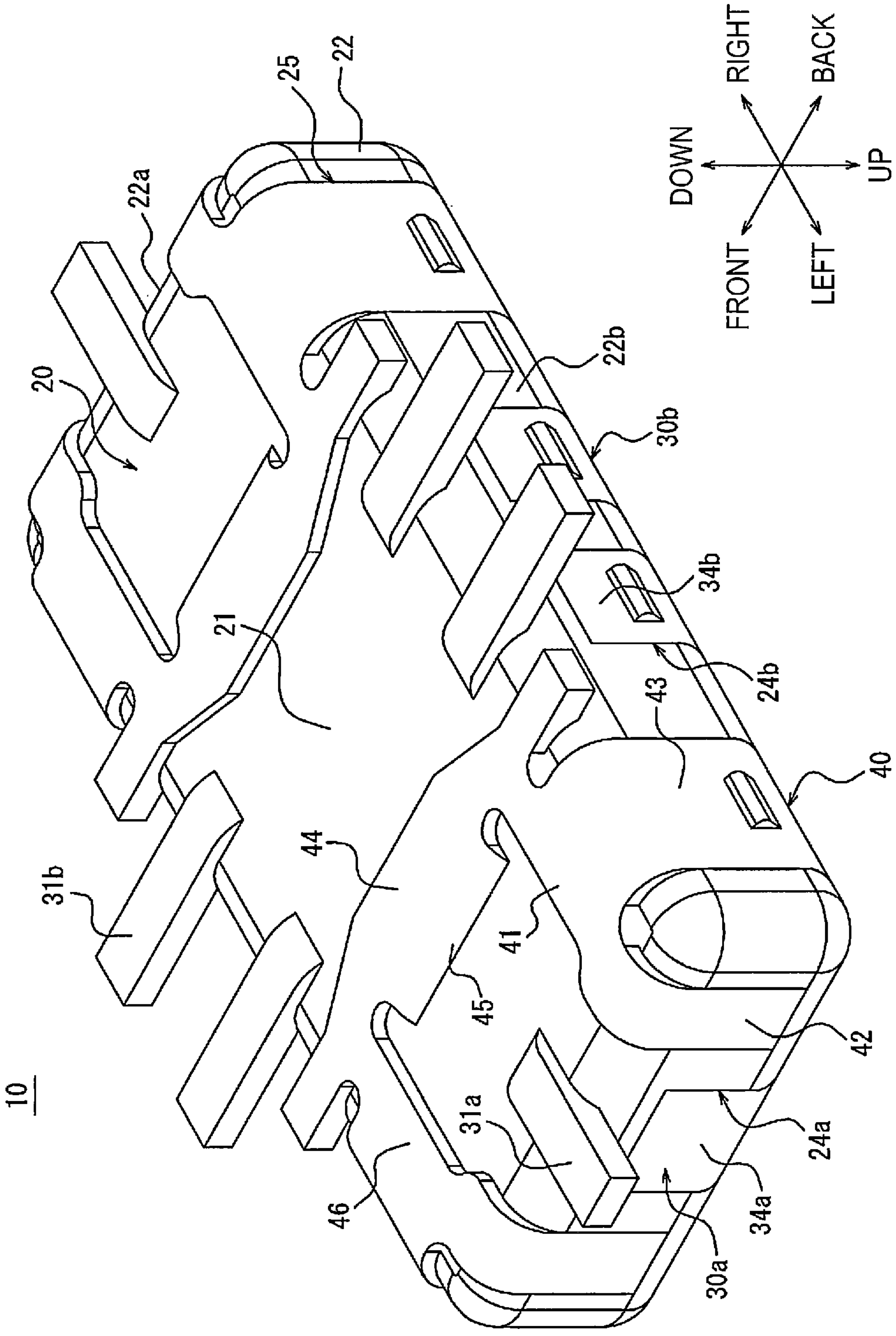
FIG. 4 is a bottom perspective view illustrating only the first connector of FIG. 1.

FIG. 3 is an external top perspective view illustrating only the first connector 10 of FIG. 1. FIG. 4 is a bottom perspective view illustrating only the first connector 10 of FIG. 1. The first connector 10 is obtained, for example, by integrally insert-molding the first contact 30*a*, the signal contact 30*b*. the first shield member 40, and the first insulator 20.

The first insulator 20 of the first connector 10 is made of an insulating and heat-resistant synthetic resin material. The first insulator 20 extends in a plate-like shape in the left-right direction. The first insulator 20 includes a bottom plate portion 21 forming a lower part thereof and a ring-shaped outer peripheral wall 22 protruding upward from the entire peripheral edge part of an upper surface of the bottom plate portion 21. The outer peripheral wall 22 includes a pair of transversal walls 22*a* that extend in the front-back direction and a pair of longitudinal walls 22*b* that extend in the left-right direction. The first insulator 20 includes a fitting recess 23 defined by a space formed by the bottom plate portion 21 and the outer peripheral wall 22.

The first insulator 20 has a first-contact holding groove 24*a* formed from an outer surface in the left-right direction of the transversal wall 22*a* of the outer peripheral wall 22 to the inside of the transversal wall 22*a*. The first-contact holding groove 24*a* integrally holds the first contact 30*a*. The first insulator 20 has a signal-contact holding groove 24*b* formed from an outer surface to an inner surface in the front-back direction of the longitudinal wall 22*b* of the outer peripheral wall 22. The signal-contact holding groove 24*b* integrally holds the signal contact 30*b*.

The first insulator 20 has a first-shield-member holding groove 25 formed from an outer surface and an inner surface in the left-right direction to an outer surface in the front-back direction of the transversal wall 22*a* of the outer peripheral wall 22. The first-shield-member holding groove 25 integrally holds the first shield member 40.

Figure 5:
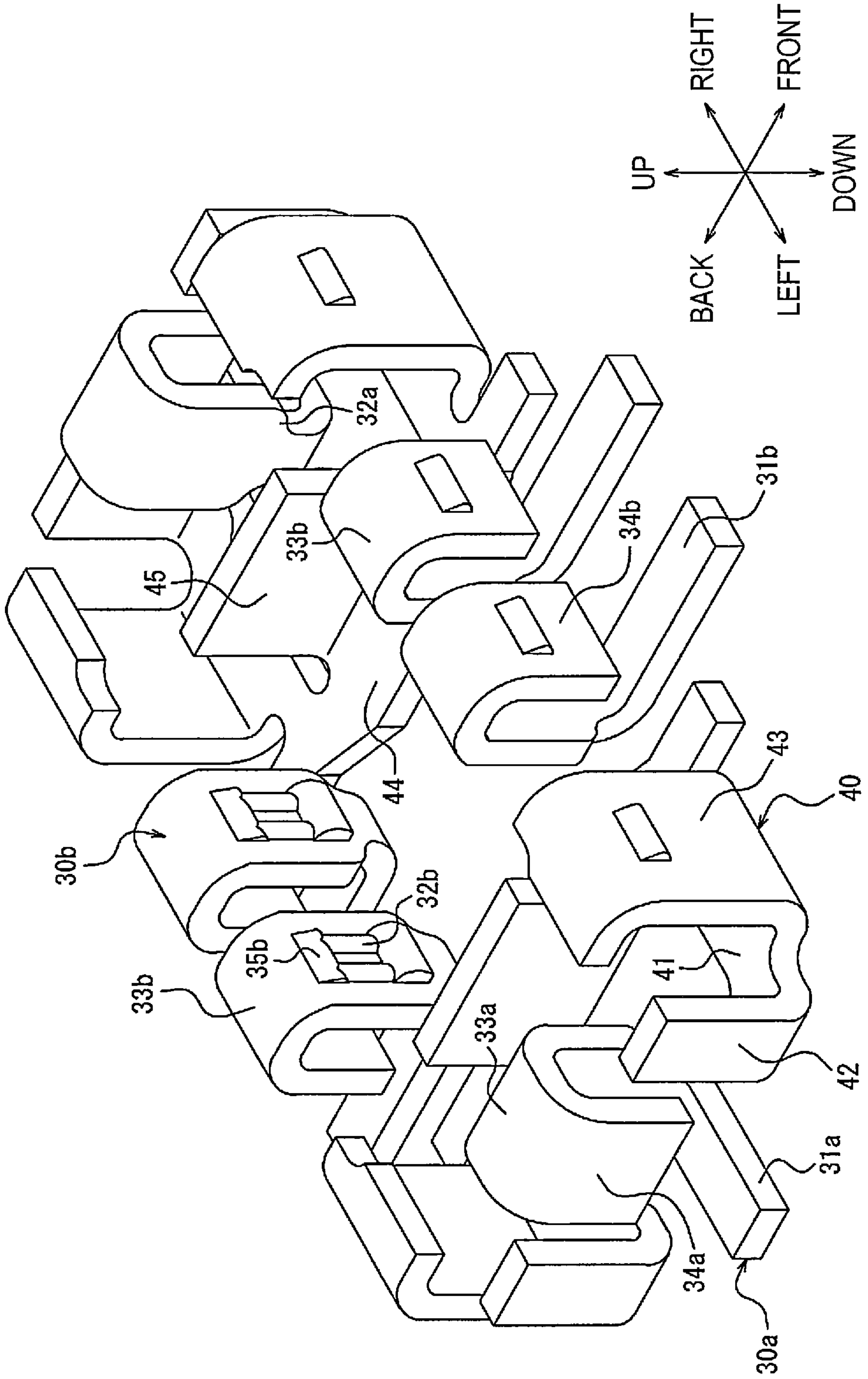
FIG. 5 is a top perspective view of the first connector of FIG. 3 in a state in which only a first insulator is not illustrated.
Figure 6:
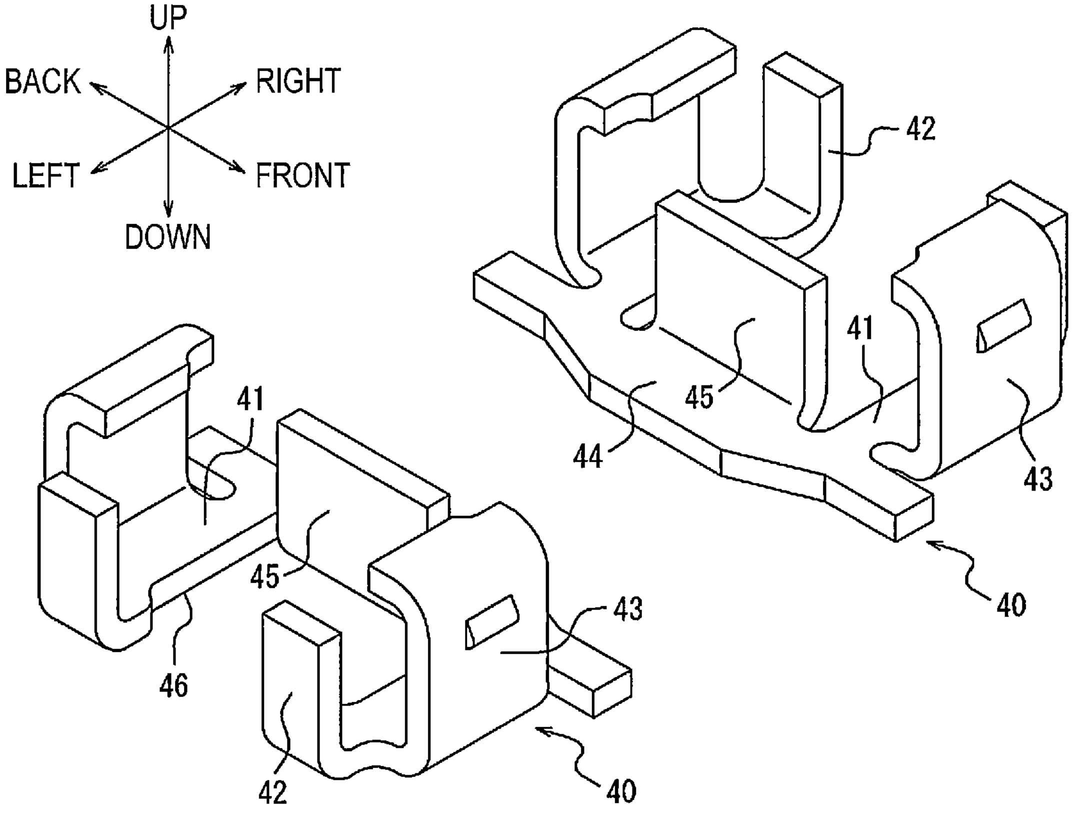
FIG. 6 is a top perspective view illustrating only a pair of first shield members of FIG. 5.
Figure 7:
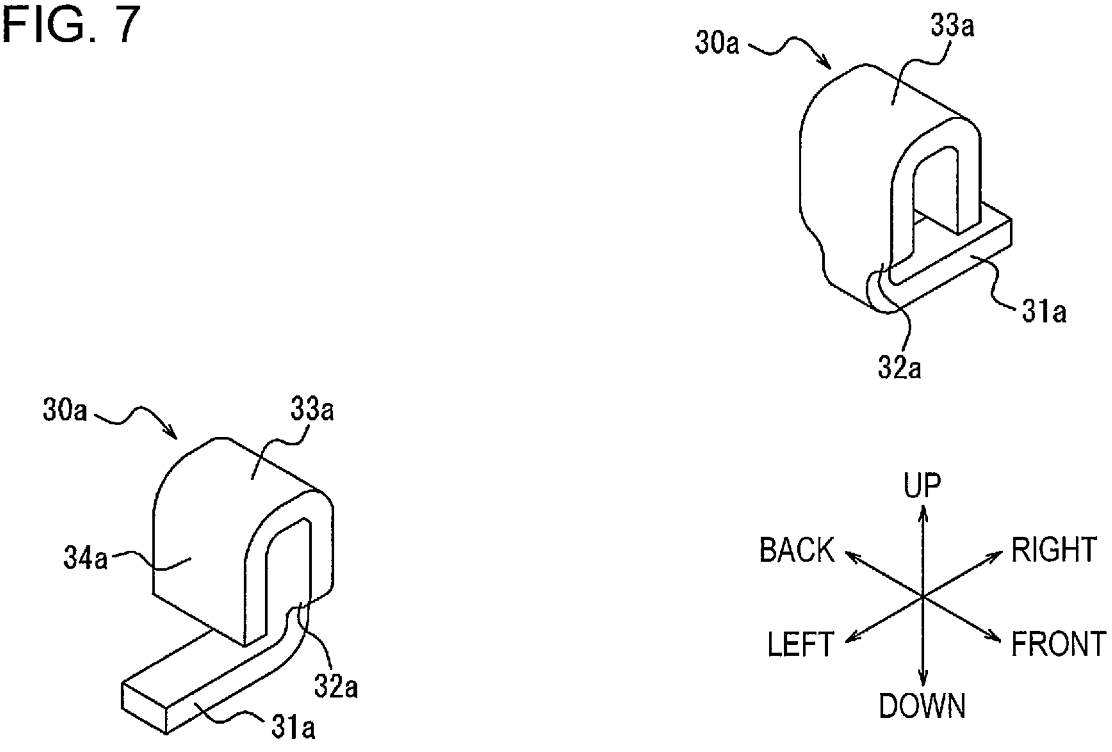
FIG. 7 is a top perspective view illustrating only a pair of first contacts of FIG. 5.

FIG. 5 is a top perspective view of the first connector 10 of FIG. 3 in a state in which only the first insulator 20 is not illustrated. FIG. 6 is a top perspective view illustrating only a pair of the first shield members 40 of FIG. 5. FIG. 7 is a top perspective view illustrating only a pair of the first contacts 30*a* of FIG. 5. Referring mainly to FIGS. 5 to 7, the configuration of each of the first contact 30*a*, the signal contact 30*b*, and the first shield member 40 will be described in detail.

The first contact 30*a* is made by, for example, forming a thin plate of: a copper alloy, including phosphor bronze, beryllium copper, or titanium copper; or a Corson copper alloy into the shape illustrated in FIGS. 5 and 7 by using a progressive die (stamping). The surface of the first contact 30*a* is plated by gold, tin, or the like after forming a sublayer by nickel plating.

The first contact 30*a* includes a mount portion 31*a* that extends outward in an L-shape. The first contact 30*a* includes a connection portion 32*a* that is formed upward in a reversely tapered shape from an upper end part of the mount portion 31*a*. The first contact 30*a* includes a curved portion 33*a* that extends in a U-shape upward from the connection portion 32*a*. The first contact 30*a* includes the first contacting portion 34*a* that is configured to include an outer surface in the left-right direction on the free-end side of the curved portion 33*a*.

As illustrated also in FIG. 3, the first contact 30*a* is held with respect to the first-contact holding groove 24*a*, because the entirety of the first contact 30*a* excluding the mount portion 31*a* is integrated with the first-contact holding groove 24*a*. The first contact 30*a* is disposed along the transversal direction of the connector 1. When the first contact 30*a* is held in the first-contact holding groove 24*a* of the first insulator 20, the tip of the mount portion 31*a* of the first contact 30*a* is positioned outside of the transversal wall 22*a*.

The signal contact 30*b* is made by, for example, forming a thin plate of: a copper alloy, including phosphor bronze, beryllium copper, or titanium copper; or a Corson copper alloy into the shape illustrated in FIG. 5 by using a progressive die (stamping). The surface of the signal contact 30*b* is plated by gold, tin, or the like after forming a sublayer by nickel plating.

The signal contact 30*b* includes a mount portion 31*b* that extends outward in an L-shape. The signal contact 30*b* includes a contacting portion 32*b* that extends upward from an upper end part of the mount portion 31*b*. The contacting portion 32*b* has a contact surface formed of an inner surface in the front-back direction. The contacting portion 32*b* is formed wider than the mount portion 31*b* in the left-right direction. The signal contact 30*b* includes a curved portion 33*b* that extends in a U-shape outward from the contacting portion 32*b*. The signal contact 30*b* includes a contacting portion 34*b* that is configured to include an outer surface in the left-right direction on the free-end side of the curved portion 33*b*. The signal contact 30*b* includes a projection 35*b* formed on an upper part of the contact surface of the contacting portion 32*b*.

The free end of the curved portion 33*b* is formed at approximately the same height position as the contacting portion 32*b*. As illustrated also in FIG. 3, the signal contact 30*b* is integrally held with respect to the signal-contact holding groove 24*b*, because the entirety of the signal contact 30*b* excluding the mount portion 31*b* is in surface-contact with the signal-contact holding groove 24*b*. When the signal contact 30*b* is held in the signal-contact holding groove 24*b* of the first insulator 20, the tip of the mount portion 31*b* of the signal contact 30*b* is positioned outside of the longitudinal wall 22*b*.

The first shield member 40 is made by forming a thin plate of any appropriate metal material into the shape illustrated in FIGS. 5 and 6 by using a progressive die (stamping). The method of forming the first shield member 40 includes a step of bending the thin plate in the plate-thickness direction after punching the thin plate. The first shield member 40 is integrally held with respect to the first-shield-member holding groove 25 of the first insulator 20, and is disposed on each of the left and right sides of the first insulator 20.

The first shield member 40 includes a first base portion 41 that forms a lower end part thereof. The first shield member 40 includes a first extending portion 42 that extends in an L-shape along the up-down direction from the first base portion 41 and that is disposed on each of two sides of the first base portion 41 in the front-back direction. The first shield member 40 includes a second extending portion 43 that extends in a U-shape along the up-down direction from each of a pair of edges, along the left-right direction, of the first base portion 41.

The first shield member 40 includes, at an inner end part thereof in the left-right direction, a coupling portion 44 that couples the first base portions 41 on the front and back sides. The first shield member 40 includes a first shield portion 45 that extends in an L-shape along the up-down direction from the coupling portion 44 and that extends over the entire width of the coupling portion 44 in the front-back direction. As illustrated also in FIG. 4, the first shield member 40 includes a mount portion 46 formed of a lower surface of the first base portion 41 on each the front and back sides. The mount portion 46, which is disposed on each of the front and back sides of one first shield member 40, is mounted, for example, in a separated state on a pair of ground patterns that are separated from each other on the mount surface the circuit board CB1.

With the first connector 10 having the structure described above, the mount portion 31*a* of the first contact 30*a* is soldered to a circuit pattern formed on the mount surface of the circuit board CB1. The mount portion 31*b* of the signal contact 30*b* is soldered to a circuit pattern formed on the mount surface. The mount portion 46 of the first shield member 40 is soldered to a circuit pattern formed on the mount surface. Thus, the first connector 10 is mounted on the circuit board CB1. For example, electronic components other than the first connector 10, such as a communication module, are mounted on the mount surface of the circuit board CB1.

Referring mainly to FIGS. 8 to 13, the configuration of the second connector 50 will be described.

Figure 8:
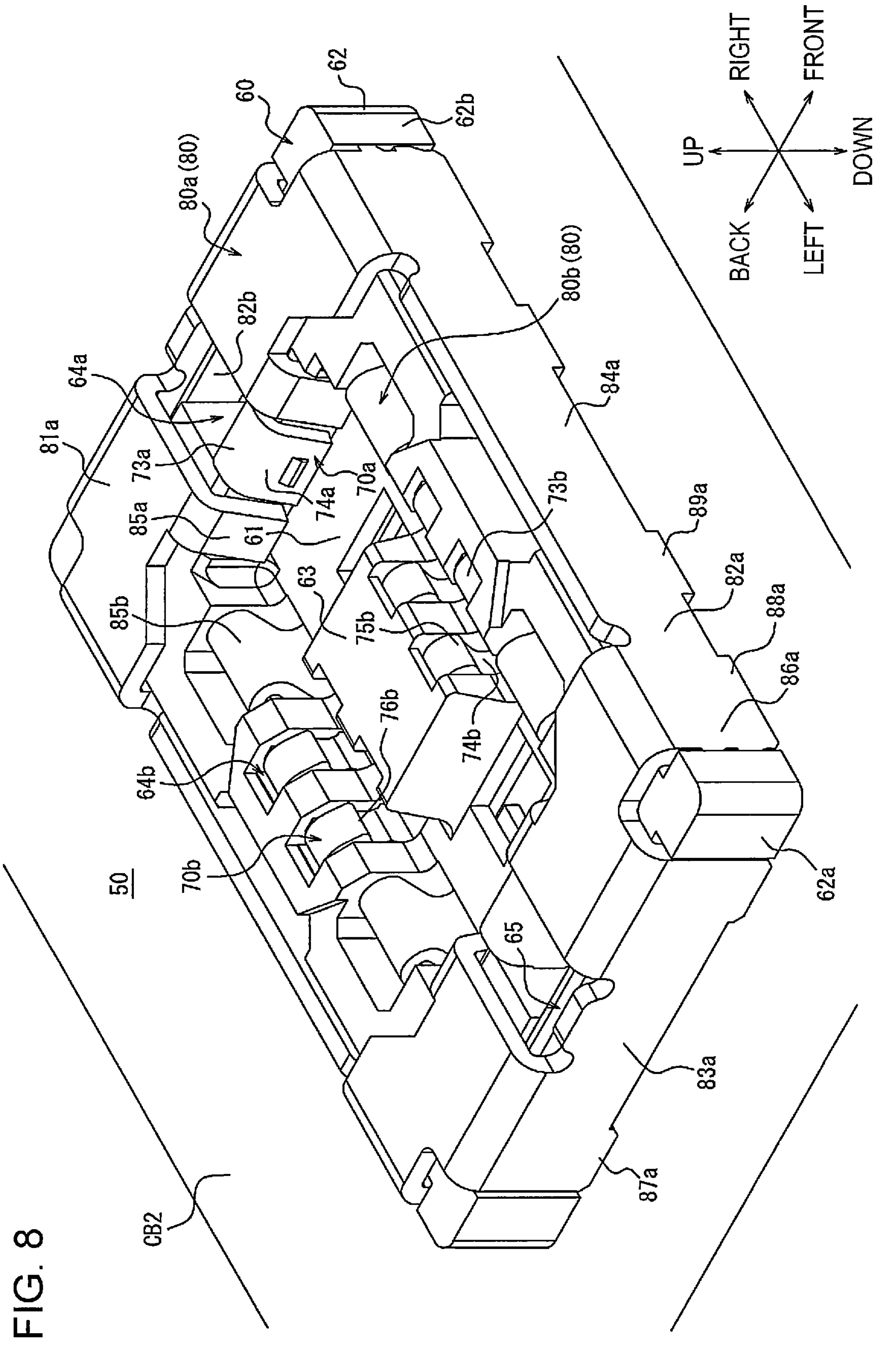
FIG. 8 is an external top perspective view illustrating only the second connector of FIG. 1.
Figure 9:
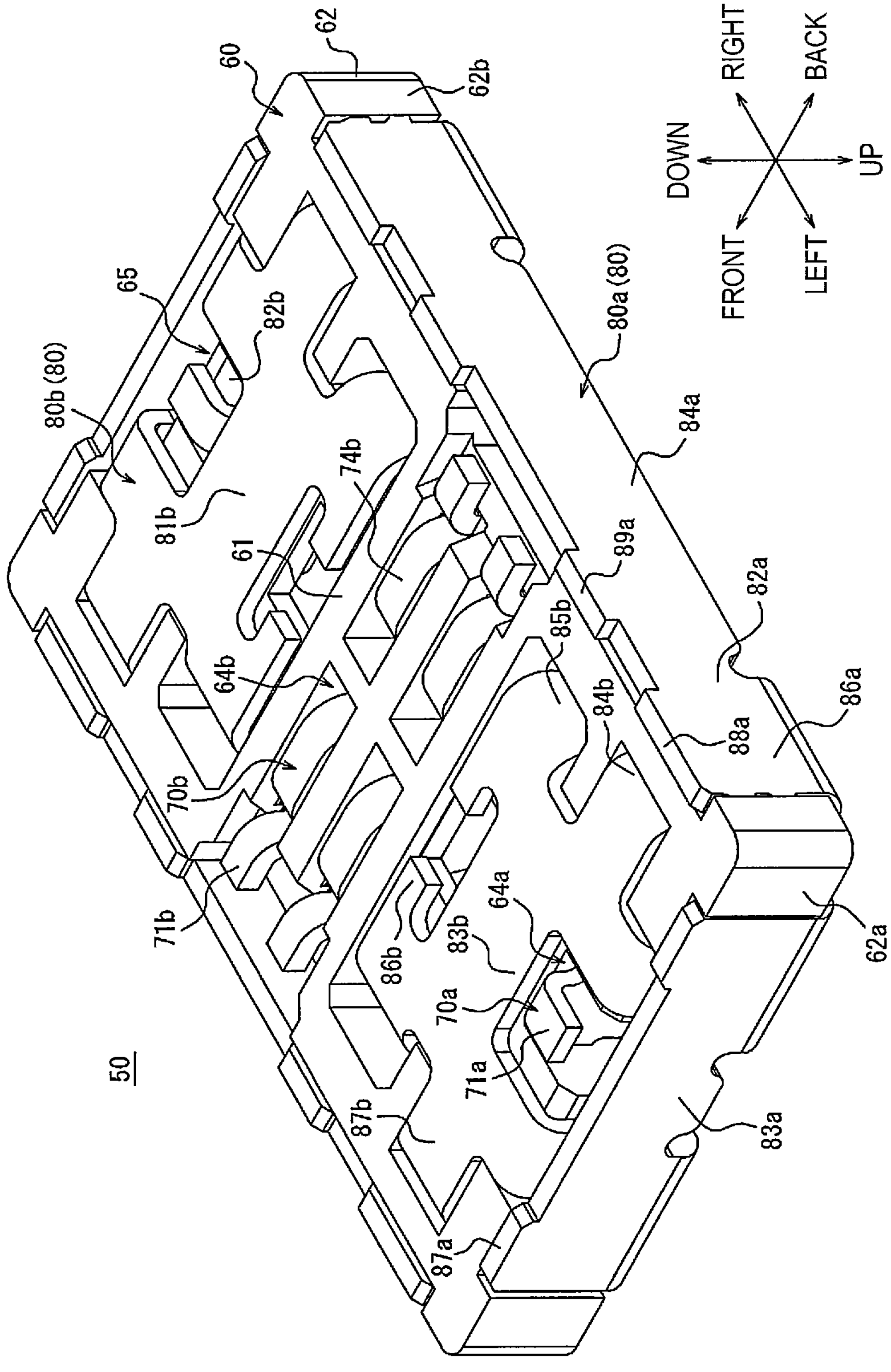
FIG. 9 is a bottom perspective view illustrating only the second connector of FIG. 1.
Figure 10:
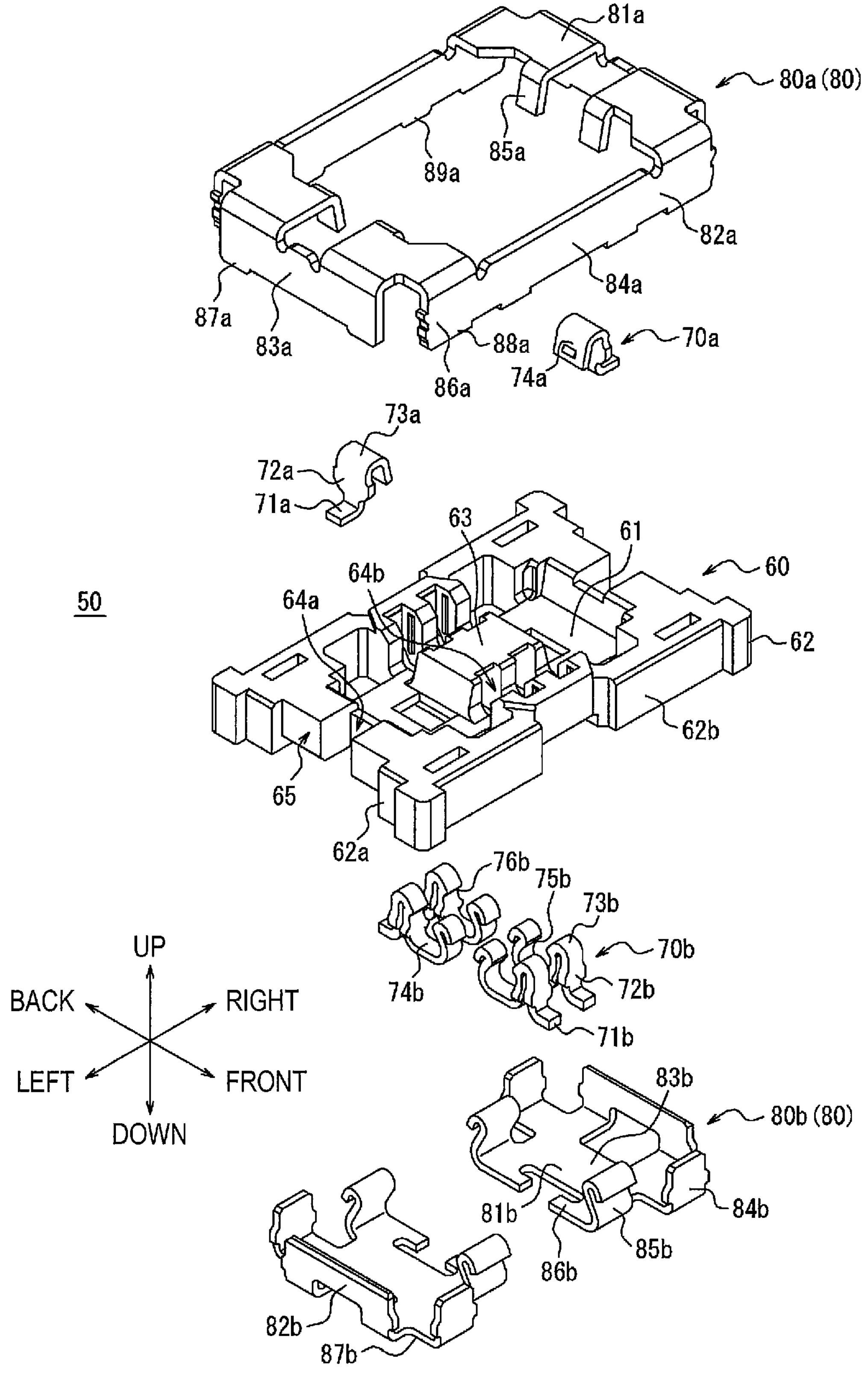
FIG. 10 is an exploded top perspective view of the second connector of FIG. 8.

FIG. 8 is an external top perspective view illustrating only the second connector 50 of FIG. 1. FIG. 9 is a bottom perspective view illustrating only the second connector 50 of FIG. 1. FIG. 10 is an exploded top perspective view of the second connector 50 of FIG. 8.

The second connector 50 is assembled, for example, by using the following method. The second contact 70*a* is press-fitted into the second insulator 60 from above. The signal contact 70*b* is press-fitted into the second insulator 60 from below. The second shield member 80 is press-fitted into the second insulator 60 from above and below.

As illustrated in FIG. 10, the second insulator 60 is a plate-shaped member that is formed by injection-molding an insulating and heat-resistant synthetic resin material and that extends in the left-right direction. The second insulator 60 includes a bottom plate portion 61 forming a lower part thereof and a ring-shaped outer peripheral wall 62 protruding upward while surrounding the entirety of the peripheral edge part of the bottom plate portion 61. The outer peripheral wall 62 includes a pair of transversal walls 62*a* that extend in the front-back direction and a pair of longitudinal walls 62*b* that extend in the left-right direction. The second insulator 60 includes a fitting raised portion 63 protruding upward from a central part of the bottom plate portion 61.

The second insulator 60 has a second-contact holding groove 64*a* formed in a central part of the transversal wall 62*a* of the outer peripheral wall 62 in the front-back direction. The second-contact holding groove 64*a* holds the second contact 70*a* pressed thereinto. The second insulator 60 has a signal-contact holding groove 64*b* formed from an inner surface in the front-back direction of the longitudinal wall 62*b* of the outer peripheral wall 62 to an outer surface in the front-back direction of the fitting raised portion 63. The signal-contact holding groove 64*b* holds the signal contact 70*b* pressed thereinto.

The second insulator 60 has a second-shield-member holding groove 65 formed from an outer surface in the left-right direction of the transversal wall 62*a* of the outer peripheral wall 62 to an outer surface in the front-back direction of the transversal wall 62*a* and inside of the transversal wall 62*a*. The second-shield-member holding groove 65 holds the second shield member 80 pressed thereinto.

Figure 11:
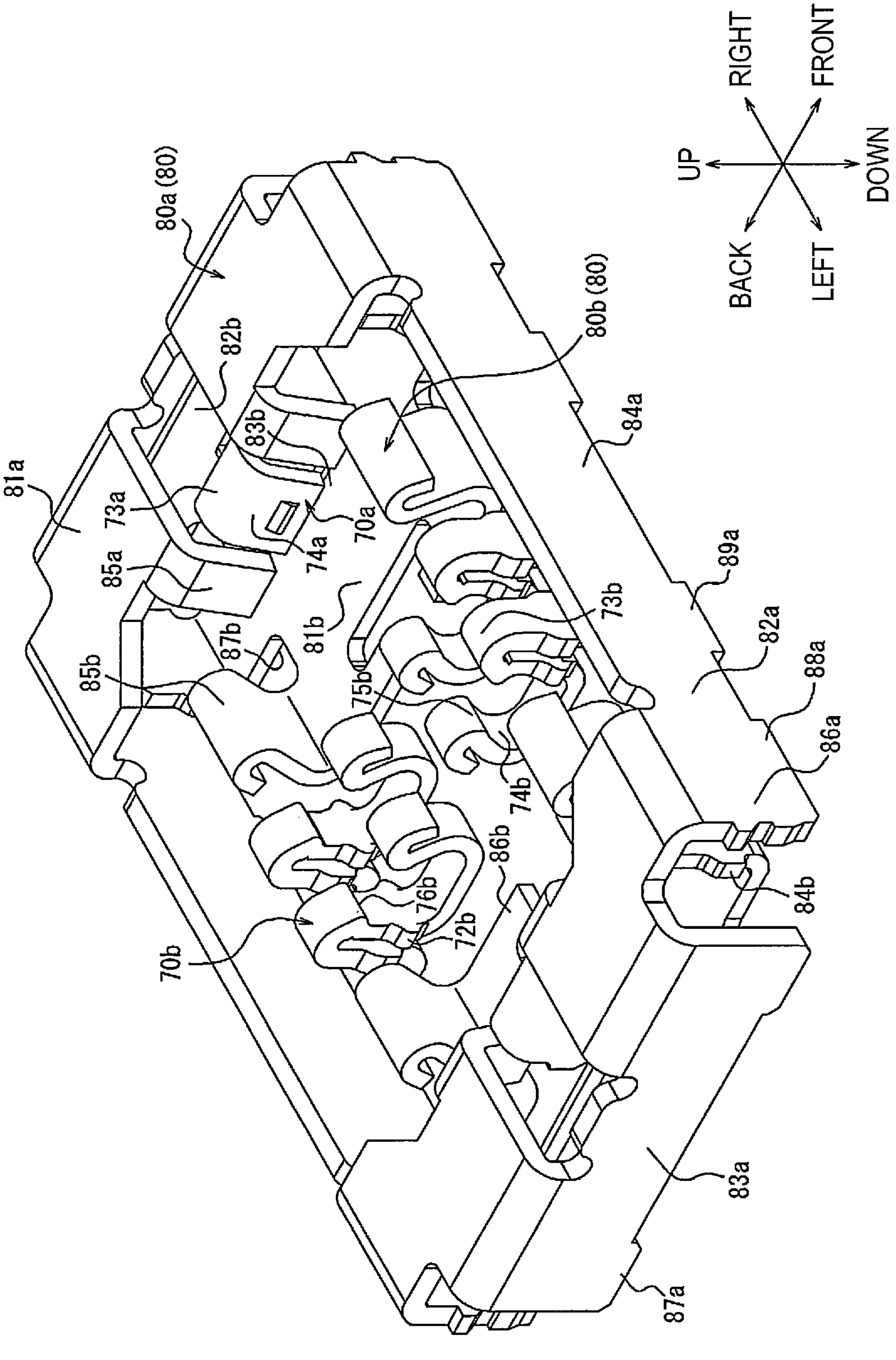
FIG. 11 is a top perspective view of the second connector of FIG. 8 in a state in which only a second insulator is not illustrated.
Figure 12:
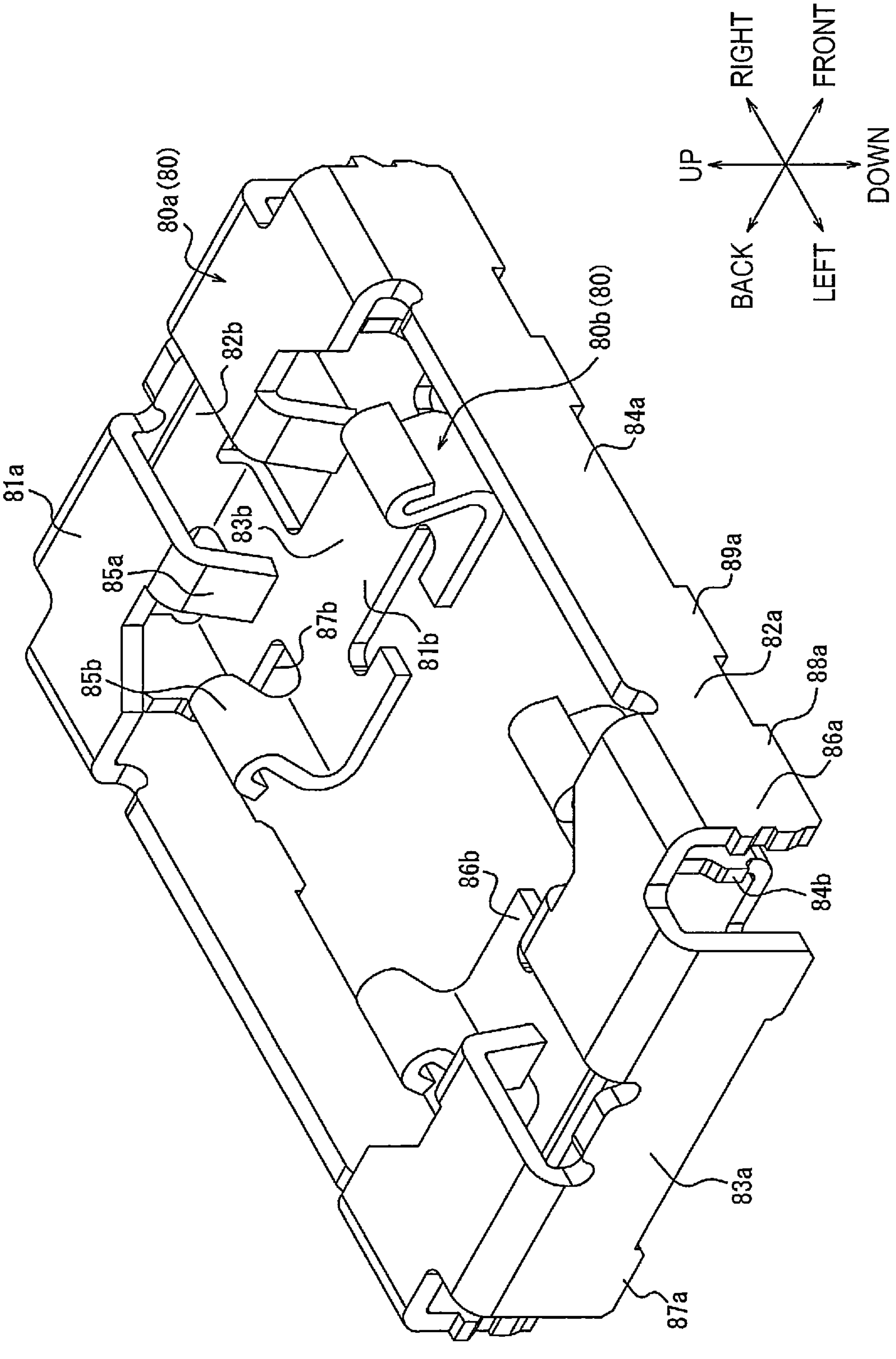
FIG. 12 is a top perspective view illustrating only the second shield member of FIG. 11.
Figure 13:
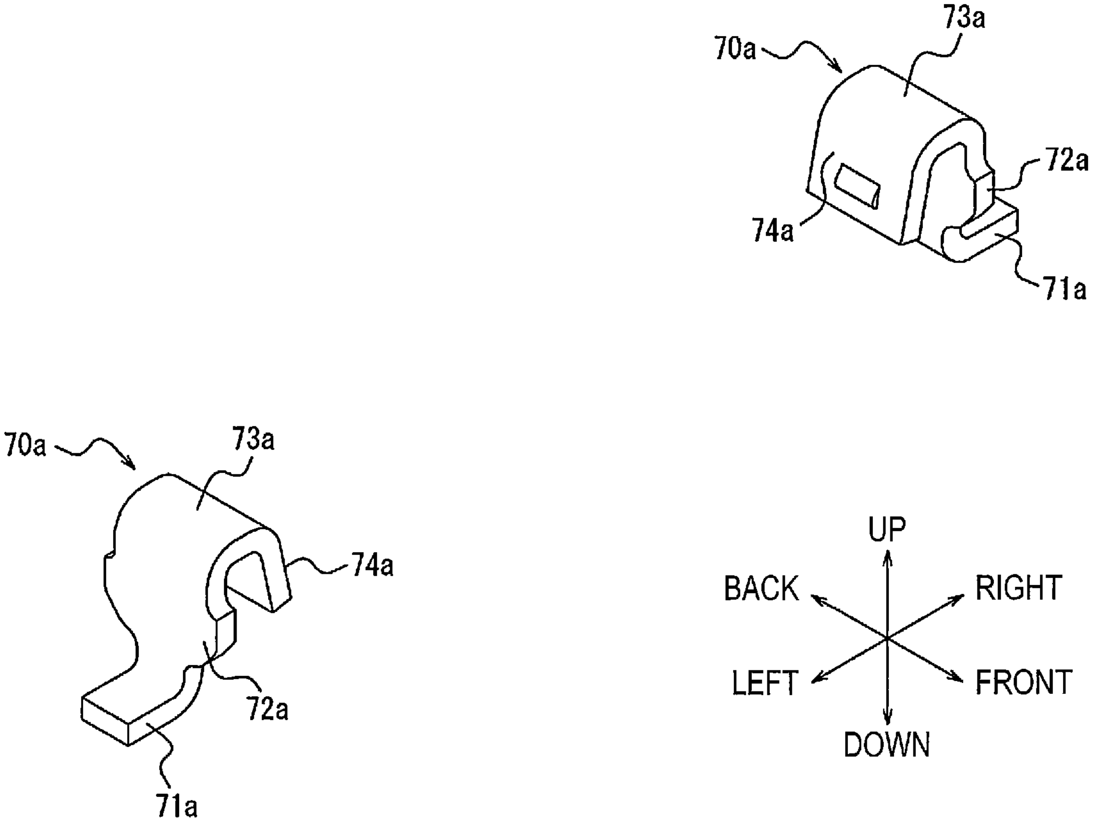
FIG. 13 is a top perspective view illustrating only a pair of second contacts of FIG. 11.

FIG. 11 is a top perspective view of the second connector 50 of FIG. 8 in a state in which only the second insulator 60 is not illustrated. FIG. 12 is a top perspective view illustrating only the second shield member 80 of FIG. 11. FIG. 13 is a top perspective view illustrating only a pair of the second contacts 70*a* of FIG. 11. Referring mainly to FIGS. 11 to 13, the configuration of each of the second contact 70*a*, the signal contact 70*b*, and the second shield member 80 will be described in detail.

The second contact 70*a* is made by, for example, forming a thin plate of: a copper alloy, including phosphor bronze, beryllium copper, or titanium copper; or a Corson copper alloy into the shape illustrated in FIGS. 11 and 13 by using a progressive die (stamping). The surface of the second contact 70*a* is plated by gold, tin, or the like after forming a sublayer by nickel plating.

The second contact 70*a* includes a mount portion 71*a* that extends outward in an L-shape. The second contact 70*a* includes a latch portion 72*a* formed continuously from an upper end part of the mount portion 71*a*. The latch portion 72*a* is formed wider in the front-back direction than the mount portion 71*a* and a curved portion 73*a* described below. The second contact 70*a* includes the curved portion 73*a* that extends in a U-shape upward from the latch portion 72*a*. The second contact 70*a* includes the second contacting portion 74*a* configured to include an inner surface in the left-right direction on the free-end side of the curved portion 73*a*. The second contacting portion 74*a* has spring elasticity so that the second contacting portion 74*a* can elastically deform along the left-right direction.

As illustrated also in FIG. 10, the second contact 70*a* is held with respect to the second-contact holding groove 64*a*, because the latch portion 72*a* is latched to the second-contact holding groove 64*a*. The second contact 70*a* is disposed along the transversal direction of the connector 1. When the second contact 70*a* is held in the second-contact holding groove 64*a* of the second insulator 60, the tip of the mount portion 71*a* of the second contact 70*a* is positioned inside of the outermost end in the left-right direction of the transversal wall 62*a*.

The signal contact 70*b* is made by, for example, forming a thin plate of: a copper alloy having spring elasticity, including phosphor bronze, beryllium copper, or titanium copper; or a Corson copper alloy into the shape illustrated in FIGS. 10 and 11 by using a progressive die (stamping). The surface of the signal contact 70*b* is plated by gold, tin, or the like after forming a sublayer by nickel plating.

As illustrated in FIG. 10, the signal contact 70*b* includes a mount portion 71*b* that extends outward in an L-shape. The signal contact 70*b* includes a pair of latch portions 72*b* including a portion that is formed upward continuously from an upper end part of the mount portion 71*b* and another portion that is separated from the portion in the front-back direction and that faces the portion. The latch portions 72*b* are formed wider than the mount portion 71*b* and a curved portion 73*b* described below in the left-right direction. The signal contact 70*b* includes the curved portion 73*b* that connects the pair of the latch portions 72*b*, an elastic contacting portion 74*b* that is S-shaped and that is continuous with the latch portion 72*b* formed inside, and a contacting portion 75*b* formed at a tip part of the elastic contacting portion 74*b* so as to face outward. The signal contact 70*b* includes a contacting portion 76*b* including a projection that projects from an inner surface in the front-back direction of the curved portion 73*b*.

The free end of the elastic contacting portion 74*b* is formed at approximately the same height position as the contacting portion 75*b*. As illustrated also in FIG. 8, the signal contact 70*b* is held with respect to the signal-contact holding groove 64*b*, because the latch portion 72*b* is latched to the signal-contact holding groove 64*b*. When the signal contact 70*b* is held in the signal-contact holding groove 64*b* of the second insulator 60, the elastic contacting portion 74*b* can elastically deform in the front-back direction in the signal-contact holding groove 64*b* formed in the fitting raised portion 63. When the signal contact 70*b* is held in the signal-contact holding groove 64*b* of the second insulator 60, the tip of the mount portion 71*b* of the signal contact 70*b* is positioned inside of the outermost end in the front-back direction of the longitudinal wall 62*b*.

The second shield member 80 is made by forming a thin plate of any appropriate metal material into the shape illustrated in FIGS. 10 to 12 by using a progressive die (stamping). The method of forming the second shield member 80 includes a step of bending the thin plate in the plate-thickness direction after punching the thin plate. The second shield member 80 is held by the second insulator 60 by being press-fitted into the second-shield-member holding groove 65 of the second insulator 60.

The second shield member 80 includes, for example, three members. To be more specific, the second shield member 80 includes a first member 80*a* that is attached to the second insulator 60 from above so as to surround the outer peripheral wall 62 from four sides. The second shield member 80 includes a pair of second members 80*b* that are attached to the second insulator 60 from below so as to be disposed on the left and right sides of the second insulator 60.

The second member 80*b* includes a second base portion 81*b* forming a lower end part thereof. The second base portion 81*b* is adjacent to the second contact 70*a* in the left-right direction. The second member 80*b* includes a second shield portion 82*b* that extends in an L-shape along the up-down direction from the second base portion 81*b* and that extends over the entire width of the second base portion 81*b* in the front-back direction. The second member 80*b* includes a third shield portion 83*b* that forms a central part of the second base portion 81*b* and that extends over the entire width of the second base portion 81*b* in the front-back direction. The second member 80*b* includes a latch portion 84*b* that extends in an L-shape along the up-down direction from each of a pair of edges, along the left-right direction, of the second base portion 81*b*.

The second member 80*b* includes a contacting portion 85*b* that is disposed inside of the latch portion 84*b* in the left-right direction and that extends in an S-shape along the up-down direction from each of a pair of edges, along the left-right direction, of the second base portion 81*b*. The contacting portion 85*b* is formed at an inner end part of the second member 80*b* in the left-right direction.

As illustrated in FIG. 9, the second member 80*b* includes a first mount portion 86*b* that is disposed inside of the second contact 70*a* in the left-right direction and that is to be mounted on the circuit board CB2. The first mount portion 86*b* is formed in an L-shape on a side of the second base portion 81*b* opposite to the second contact 70*a* in the left-right direction. The first mount portion 86*b* is formed at an inner end part of the second member 80*b* in the left-right direction. A pair of the first mount portions 86*b* are disposed respectively on the front and back sides of the second base portion 81*b* in the second member 80*b*. The first mount portions 86*b* are symmetrically disposed on both sides with respect to the second contact 70*a* in the front-back direction. The pair of first mount portions 86*b* are respectively mounted, for example, in a separated state on a pair of circuit patterns that are separated from each other on the mount surface of the circuit board CB2.

As illustrated also in FIG. 9, the second member 80*b* includes a second mount portion 87*b* that is formed by a lower surface on each of the front and back sides of an outer end part of the second base portion 81*b* in the left-right direction and a lower surface of the latch portions 84*b* on each of the front and back sides. The second mount portion 87*b* disposed on the front side and the second mount portion 87*b* disposed on the back side of one second member 80*b* are respectively mounted, for example, on a pair of circuit patterns that are separated from each other on the mount surface of the circuit board CB2.

As illustrated in FIG. 12, the contacting portion 85*b* extends upward from the first mount portion 86*b*. The contacting portion 85*b* extends from an end part, outside in the front-back direction, of the first mount portion 86*b*. To be more specific, the contacting portion 85*b* extends in an S-shape from the first mount portion 86*b* and has spring elasticity. As illustrated in FIG. 11, the contacting portion 85*b* extends along the left-right direction between the first mount portion 86*b* and the second contact 70*a*. The width of the contacting portion 85*b* in the left-right direction is greater than or equal to the mount width of the first mount portion 86*b* in the left-right direction. The contacting portion 85*b* is symmetrically disposed on each of two sides with respect to the second contact 70*a* in the front-back direction.

As illustrated also in FIG. 10, the second member 80*b* is held with respect to the second-shield-member holding groove 65, because the latch portion 84*b* and the second shield portion 82*b* are latched to the second-shield-member holding groove 65. To be more specific, the pair of latch portions 84*b* are latched to grooves of the second-shield-member holding groove 65 that are formed inside of the front and back sides of the transversal wall 62*a*. The second shield portion 82*b* is latched to a groove of the second-shield-member holding groove 65 that is formed in an outer surface in the left-right direction of the transversal wall 62*a*.

The first member 80*a* includes a third base portion 81*a* that forms an upper end part thereof. The first member 80*a* includes, a fourth shield portion 82*a* that extends in the left-right direction with a predetermined width in an outer peripheral part thereof in the front-back direction. The first member 80*a* includes a fifth shield portion 83*a* that is disposed further outside than the second shield portion 82*b* in the left-right direction. The fifth shield portion 83*a* has a larger width in the front-back direction than the second shield portion 82*b*, and is disposed so as to overlap the entirety of the second shield portion 82*b* in the front-back direction. As illustrated also in FIG. 8, the first member 80*a* includes an outer-peripheral-side shield portion 84*a* that is disposed outside of the longitudinal wall 62*b* of the second insulator 60 along the left-right direction. The outer-peripheral-side shield portion 84*a* extends along the left-right direction so as to couple the fourth shield portions 82*a* positioned on the left and right sides.

As illustrated in FIG. 11, the first member 80*a* includes a contacting portion 85*a* that extends along the up-down direction from the third base portion 81*a* and that is disposed on each of two sides with respect to the second contact 70*a* in the front-back direction. The contacting portion 85*a* has spring elasticity so that the contacting portion 85*a* can elastically deform along the left-right direction. The first member 80*a* includes a latch portion 86*a* that is formed at each of two end parts, in the left-right direction, of an outer peripheral part thereof in the front-back direction.

The first member 80*a* includes a first mount portion 87*a* that extends linearly downward from a lower end part on each of the front and back sides of the fifth shield portion 83*a*. The first member 80*a* includes a second mount portion 88*a* that extends linearly downward from a lower end part of the latch portion 86*a*. The first member 80*a* includes a third mount portion 89*a* that extends linearly downward from each of the left and right end parts of the outer-peripheral-side shield portion 84*a*. For example, the first mount portion 87*a* on the front side in the left direction and the second mount portion 88*a* on the left side in the front direction that are adjacent to each other are mounted on the same ground pattern on the mount surface of the circuit board CB2. For example, the first mount portion 87*a* on the back side in the left direction and the second mount portion 88*a* on the left side in the back direction that are adjacent to each other are mounted on the same ground pattern on the mount surface of the circuit board CB2. The right side of the first member 80*a* is configured in the same way. For example, four third mount portions 89*a* are respectively mounted, in a separated state, on four ground patterns that are separated from each other on the mount surface of the circuit board CB2.

As illustrated also in FIG. 10, the first member 80*a* is held with respect to the second-shield-member holding groove 65, because the latch portion 86*a* is latched to the second-shield-member holding groove 65.

With the second connector 50 structured as described above, the mount portion 71*a* of the second contact 70*a* is soldered to a circuit pattern formed on the mount surface of the circuit board CB2. The mount portion 71*b* of the signal contact 70*b* is soldered to a circuit pattern formed on the mount surface. The first mount portion 87*a*, the second mount portion 88*a*, and the third mount portion 89*a* of the first member 80*a* of the second shield member 80; and the first mount portion 86*b* and the second mount portion 87*b* of the second member 80*b* are soldered to a ground pattern formed on the mount surface. For example, the first mount portion 87*a* on the front side in the left direction and the second mount portion 88*a* on the left side in the front direction of the first member 80*a*; and the second mount portion 87*b* on the front side of the second member 80*b* that is disposed on the left side are soldered to the same ground pattern. The same applies to the back side of the second member 80*b* that is disposed on the left side and to the second member 80*b* that is disposed on the right side. Thus, it is possible to regard the first member 80*a* and the second member 80*b* electrically as one shield member. In the way described above, the second connector 50 is mounted on the circuit board CB2. For example, electronic components other than the second connector 50, such as a central processing unit (CPU), a controller, and a memory, are mounted on the mount surface of the circuit board CB2.

Figure 14:
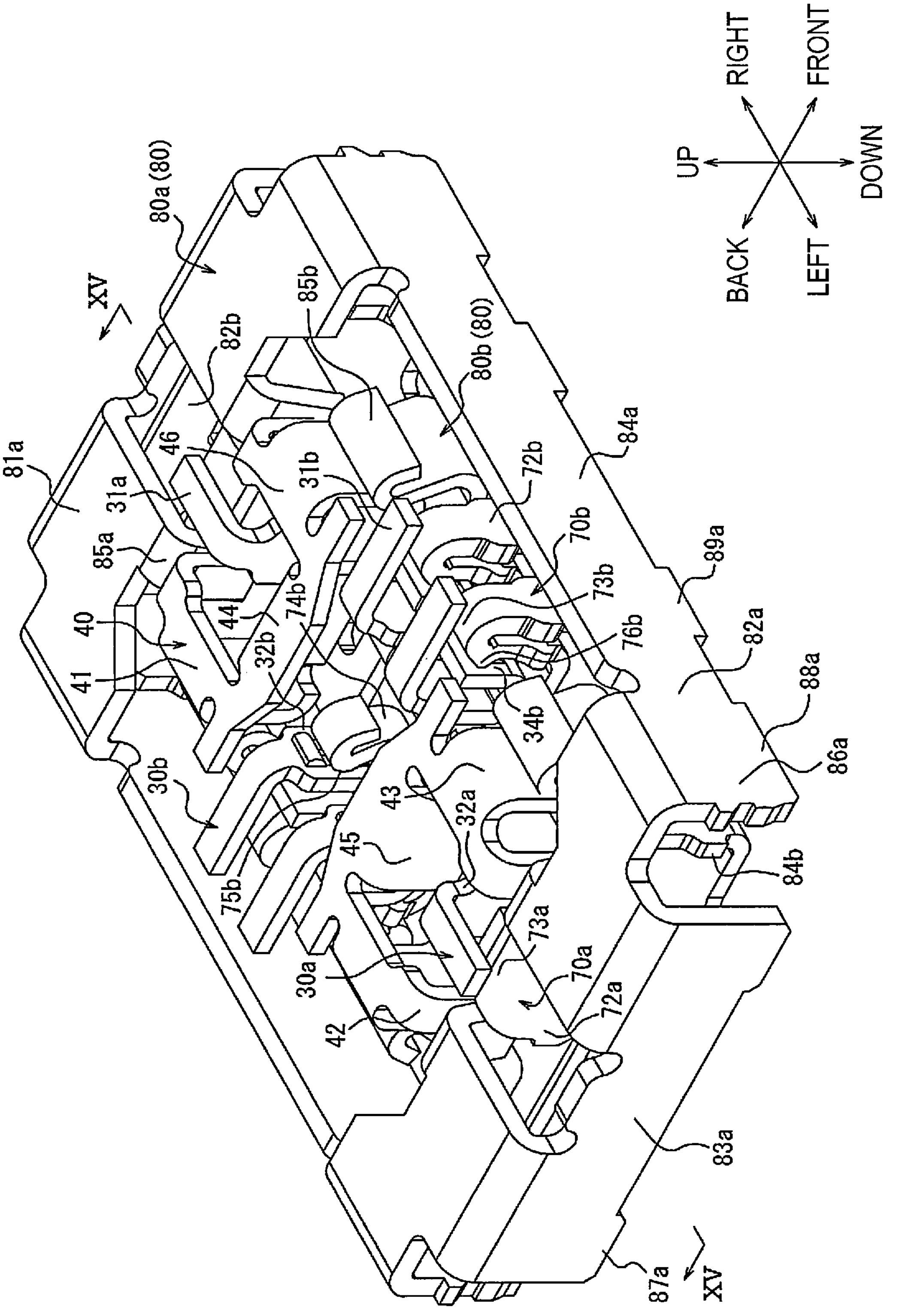
FIG. 14 is a top perspective view of the connector of FIG. 1 in a state in which only the first insulator and the second insulator are not illustrated.
Figure 15:
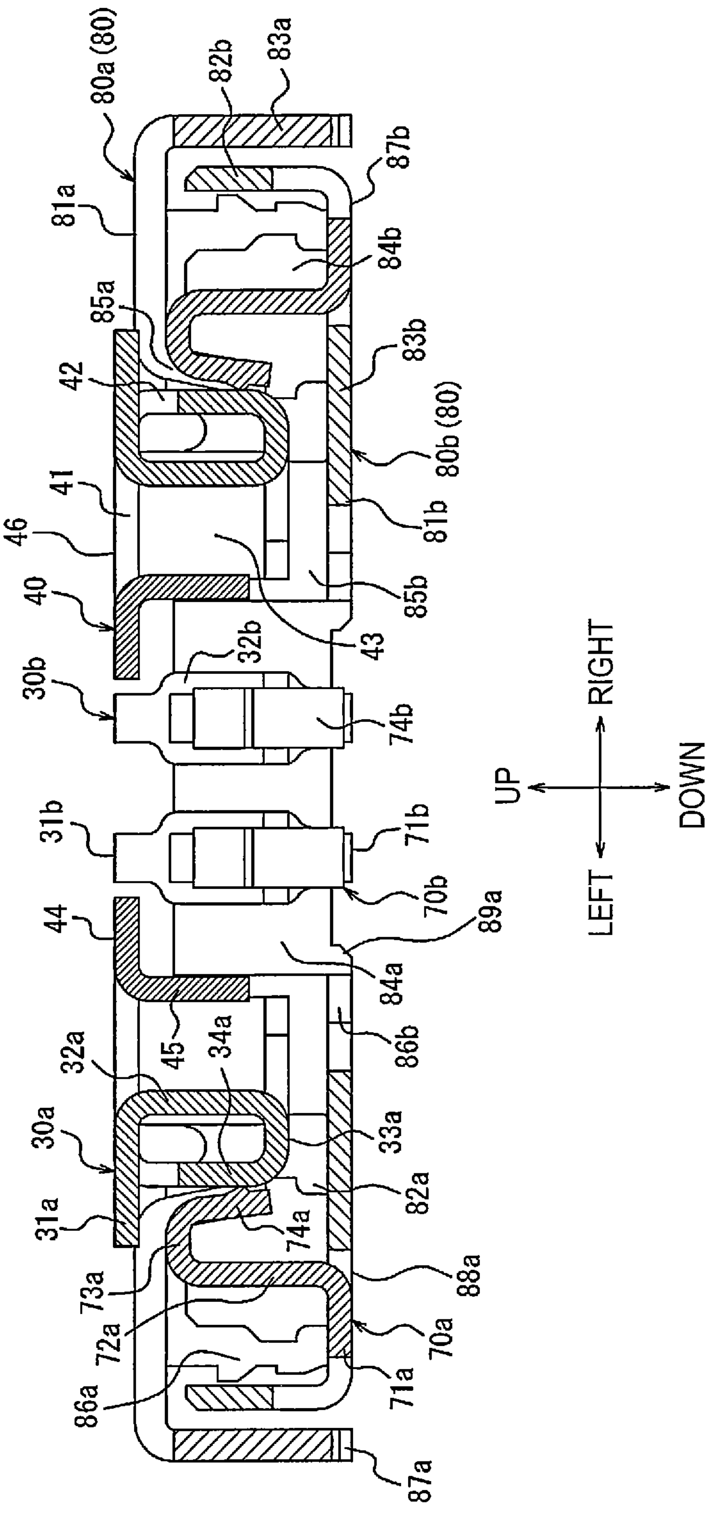
FIG. 15 is a sectional view taken along an arrow XV-XV of FIG. 14.

FIG. 14 is a top perspective view of the connector 1 of FIG. 1 in a state in which only the first insulator 20 and the second insulator 60 are not illustrated. FIG. 15 is a sectional view taken along an arrow XV-XV of FIG. 14. Referring to FIGS. 14 and 15, the configuration of the connector 1 in a fitted state in which the first connector 10 and the second connector 50 are connected and the first insulator 20 and the second insulator 60 are fitted to each other will be described.

For example, in a state in which the orientation in the up-down direction of the first connector 10 illustrated in FIG. 3 is inverted, the first connector 10 and the second connector 50 are caused to face each other in the up-down direction while causing the front-back positions and the left-right positions thereof to approximately coincide with each other. The first connector 10 is moved downward. Thus, the first connector 10 and the second connector 50 are connected to each other, and the fitted state of the connector 1 can be obtained. At this time, the fitting recess 23 of the first insulator 20 and the fitting raised portion 63 of the second insulator 60 are fitted to each other.

In the fitted state of the connector 1, the first contacting portion 34*a* of the first contact 30*a* and the second contacting portion 74*a* of the second contact 70*a* are in contact with each other, and the second contacting portion 74*a*, which has spring elasticity, is elastically deformed outward in the left-right direction. The first contact 30*a* and the second contact 70*a* are in contact with each other at only one point due to the first contacting portion 34*a* and the second contacting portion 74*a*.

In the fitted state of the connector 1, the projection 35*b* of the signal contact 30*b* has moved over the contacting portion 75*b* of the signal contact 70*b* while moving downward, and the contacting portion 32*b* of the signal contact 30*b* and the contacting portion 75*b* of the signal contact 70*b* are in contact with each other. At this time, the elastic contacting portion 74*b*, which has spring elasticity, is elastically deformed inward in the front-back direction. Likewise, the contacting portion 34*b* of the signal contact 30*b* and the contacting portion 76*b* of the signal contact 70*b* are in contact with each other. The signal contact 30*b* and the signal contact 70*b* are in contact with each other at two points due to the contacting portion 32*b* and the contacting portion 75*b* and due to the contacting portion 34*b* and the contacting portion 76*b*.

In the fitted state of the connector 1, the first extending portion 42 of the first shield member 40 and the contacting portion 85*a* of the first member 80*a* of the second shield member 80 are in contact with each other. The first extending portion 42 of the first shield member 40 extends along the up-down direction from the first base portion 41, and is disposed on each of two sides, in the front-back direction, with respect to the contact part between the first contact 30*a* and the second contact 70*a*. To be more specific, the first extending portion 42 of the first shield member 40 is disposed adjacent to the first contacting portion 34*a* and the second contacting portion 74*a*, which are in contact with each other, on each of two sides in the front-back direction. Likewise, the contacting portion 85*a* of the first member 80*a* extends along the up-down direction from the third base portion 81*a*, which is disposed on the same side as the first base portion 41 in the up-down direction, and is disposed on each of two sides, in the front-back direction, with respect to the contact part between the first contact 30*a* and the second contact 70*a*. To be more specific, the contacting portion 85*a* of the first member 80*a* is disposed so as to be adjacent to the first contacting portion 34*a* and the second contacting portion 74*a*, which are in contact with each other, on each of two sides in the front-back direction.

As described above, in the fitted state, the first shield member 40 and the first member 80*a* are in contact with each other at two points due to two pairs of the first extending portions 42 and the contacting portions 85*a* that sandwich the first contacting portion 34*a* and the second contacting portion 74*a* in the front-back direction while being adjacent thereto. The two pairs of first extending portions 42 and contacting portions 85*a* are symmetrically disposed on both sides, in the front-back direction, with respect to the contact part between the first contact 30*a* and the second contact 70*a*.

In the fitted state of the connector 1, the second extending portion 43 of the first shield member 40 and the contacting portion 85*b* of the second member 80*b* of the second shield member 80 are in contact with each other. The second extending portion 43 of the first shield member 40 extends along the up-down direction from the first base portion 41, and is disposed on each of two sides, in the front-back direction, with respect to the contact part between the first contact 30*a* and the second contact 70*a*. To be more specific, the second extending portion 43 of the first shield member 40 is disposed in proximity to the first contacting portion 34*a* and the second contacting portion 74*a*, which are in contact with each other, on each of two sides in the front-back direction. Likewise, the contacting portion 85*b* of the second member 80*b* extends along the up-down direction from the second base portion 81*b*, which is disposed on a side opposite to the first base portion 41 in the up-down direction, and is disposed on each of two sides, in the front-back direction, with respect to the contact part between the first contact 30*a* and the second contact 70*a*. To be more specific, the contacting portion 85*b* of the second member 80*b* is disposed so as to be in proximity to the first contacting portion 34*a* and the second contacting portion 74*a*, which are in contact with each other, on each of two sides in the front-back direction.

As described above, in the fitted state, the first shield member 40 and the second member 80*b* are in contact with each other at two points due to two pairs of the second extending portions 43 and the contacting portions 85*b* that sandwich the first contacting portion 34*a* and the second contacting portion 74*a*, which are in contact with each other, while being in proximity thereto. The two pairs of second extending portions 43 and contacting portions 85*b* are symmetrically disposed on both sides, in the front-back direction, with respect to the contact part between the first contact 30*a* and the second contact 70*a*.

As described above, in the fitted state, the first shield member 40 and the second shield member 80 are in contact with each other at four points that are adjacent to or in proximity to the first contacting portion 34*a* and the second contacting portion 74*a*, which are in contact with each other.

In the fitted state of the connector 1, the first shield portion 45 of the first shield member 40 is disposed inside in the left-right direction of the first contacting portion 34*a* and the second contacting portion 74*a*, which are in contact with each other. The second shield portion 82*b* of the second member 80*b* of the second shield member 80 is disposed outside in the left-right direction of the first contacting portion 34$a$ and the second contacting portion 74$a$, which are in contact with each other. As described above, the first contacting portion 34$a$ and the second contacting portion 74$a$, which are in contact with each other, are shielded by the first shield portion 45 and the second shield portion 82$b$ from both sides in the left-right direction.

In the fitted state of the connector 1, the third shield portion 83$b$ of the second member 80$b$ of the second shield member 80 is disposed on a side opposite to the fitting side in the up-down direction of the first contacting portion 34$a$ and the second contacting portion 74$a$, which are in contact with each other. In this way, the first contacting portion 34$a$ and the second contacting portion 74$a$, which are in contact with each other, are shielded by the third shield portion 83$b$ from the side opposite to the fitting side.

In the fitted state of the connector 1, the fourth shield portion 82$a$ of the first member 80$a$ of the second shield member 80 is disposed on each of two sides in the front-back direction with respect to the first contacting portion 34$a$ and the second contacting portion 74$a$, which are in contact with each other. In this way, the first contacting portion 34$a$ and the second contacting portion 74$a$, which are in contact with each other, are shielded by the fourth shield portion 82$a$ from each of two sides in the front-back direction.

In the fitted state of the connector 1, the fifth shield portion 83$a$ of the first member 80$a$ of the second shield member 80 is disposed further outside than the second shield portion 82$b$ in the left-right direction. In this way, the first contacting portion 34$a$ and the second contacting portion 74$a$, which are in contact with each other, are shielded by the double structure of the second shield portion 82$b$ and the fifth shield portion 83$a$ outside in the left-right direction.

With the connector 1 according to one embodiment, it is possible to obtain good transmission characteristics for high-frequency signals. For example, the first extending portion 42 of the first shield member 40 extends along the up-down direction from the first base portion 41, and is disposed on each of two sides, in the front-back direction, with respect to the contact part between the first contact 30$a$ and the second contact 70$a$. Accordingly, it is possible to form a good return path adjacent to each of two sides in the front-back direction with respect to the contact part between the first contact 30$a$ and the second contact 70$a$. Thus, it becomes easier for a signal to flow through the return path, and transmission characteristics for high-frequency signals are improved. If flow in the return path in uneven on the left and right, the magnetic field of an electric current returning through the return path the is disturbed and noise is likely to be generated. However, with the connector 1 according to one embodiment, generation of such noise is suppressed. Accordingly, it is possible to suppress deterioration of electromagnetic interference (EMI) characteristics.

The shield member includes the first shield member 40 attached to the first insulator 20 and the second shield member 80 attached to the second insulator 60, and the first base portion 41 and the first extending portion 42 are formed in the first shield member 40. Thus, for example, compared with a case where the shield member is integrally formed, workability when connecting the first connector 10 and the second connector 50 is improved. Because the first base portion 41 and the first extending portion 42 are integrally formed in the first shield member 40, the electroconductivity is high and the noise shielding effect is high.

The second extending portion 43 of the first shield member 40 and the contacting portion 85$b$ of the second shield member 80 are in contact with each other on each of two sides, in the front-back direction, with respect to the contact part between the first contact 30$a$ and the second contact 70$a$. Thus, a good return path is formed in proximity to each of two sides in the front-back direction of the contact part. Thus, it becomes easier for a signal to flow through the return path, and transmission characteristics for high-frequency signals are improved. If flow in the return path in uneven on the left and right, the magnetic field of an electric current returning through the return path the is disturbed and noise is likely to be generated. However, with the connector 1 according to one embodiment, generation of such noise is suppressed. Accordingly, it is possible to suppress deterioration of EMI characteristics.

Because the two pairs of second extending portions 43 and contacting portions 85$b$ are symmetrically disposed on both sides, in the front-back direction, with respect to the contact part between the first contact 30$a$ and the second contact 70$a$, a return path is symmetrically formed. Thus, it becomes easier for a signal to flow through the return path, and transmission characteristics for high-frequency signals are further improved.

The first extending portion 42 of the first shield member 40 and the contacting portion 85$a$ of the second shield member 80 are in contact with each other on each of two sides, in the front-back direction, with respect to the contact part between the first contact 30$a$ and the second contact 70$a$. Thus, a good return path is formed adjacent to each of two sides in the front-back direction of the contact part. Thus, it becomes easier for a signal to flow through the return path, and transmission characteristics for high-frequency signals are improved.

Because the two pairs of first extending portions 42 and contacting portions 85$a$ are symmetrically disposed on both sides, in the front-back direction, with respect to the contact part between the first contact 30$a$ and the second contact 70$a$, a return path is symmetrically formed. Thus, it becomes easier for a signal to flow through the return path, and transmission characteristics for high-frequency signals are further improved.

The two pairs of first extending portions 42 and contacting portions 85$a$ and the two pairs of second extending portions 43 and contacting portions 85$b$ are symmetrically disposed on both sides, in the front-back direction, with respect to the contact part between the first contact 30$a$ and the second contact 70$a$. Thus, the return path is symmetrically formed at four positions. Thus, it becomes easier for a signal to flow through the return path, and transmission characteristics for high-frequency signals are further improved. Because the first contact 30$a$ and the second contact 70$a$ are surrounded with respect to two dimensions in the front-back direction and the left-right direction, the noise shielding effect is increased.

Because the second contact 70$a$ is disposed along the transversal direction of the connector 1, the width of the connector 1 in the longitudinal direction is reduced. Accordingly, the connector 1 is reduced in size in the longitudinal direction. For example, because the number of positions and directions for disposing antennas are increasing in communication terminals in recent years, which are adapted to high-speed transmission, reduction in size of a connector incorporated in the communication terminals is required for space-saving. It is possible for the connector 1 according to one embodiment to fulfill such a requirement. Because it is possible to separate the signal contact 30$b$ and the signal contact 70$b$ far from each other in the connector 1, it is possible to shield the signal contact 30$b$ and the signal contact 70$b$ by using shield members that are independent from each other. At this time, it is possible to perform shielding from multiple directions, because a sufficient space for providing the shield members can be obtained.

It is clear for a person having ordinary skill in the art that the present disclosure can be realized in other predetermined embodiments other than the embodiments described above without departing from the spirit and essential features thereof. Accordingly, the foregoing description is exemplary, and the present disclosure is not limited to this. The scope of the disclosure is defined not by the foregoing description but by the attached claims. Among all modifications, some of modifications within the equivalents thereof are included the scope of the disclosure.

For example, the shape, the disposition, the orientation, and the number of each element described above are not limited to those in the forgoing descriptions and drawings. The shape, the disposition, the orientation, and the number of each element may be determined in any appropriate way as long as the function thereof can be realized.

A method of assembling the first connector 10 and the second connector 50 described above is not limited to what has been described above. A method of assembling the first connector 10 and the second connector 50 may be any method as long as the method allows assembly so that the functions of each of these can be fully exploited. For example, in the first connector 10, at least one of the first contact 30*a*, the signal contact 30*b*, and the first shield member 40 may be attached to the first insulator 20 not by insert molding but by press-fitting. For example, in the second connector 50, at least one of the second contact 70*a*, the signal contact 70*b*, and the second shield member 80 may be integrally formed with the second insulator 60 not by press-fitting but by insert molding.

In the above embodiment, it has been described that the shield member includes the first shield member 40 and the second shield member 80. However, the configuration of the shield member is not limited to this. For example, the shield member may be integrally formed and may be attached to at least one of the first insulator 20 and the second insulator 60 that are in the fitted state.

In the above embodiment, it has been described that the first shield portion 45 is formed in the first shield member 40 and that the second shield portion 82*b* and the third shield portion 83*b* are formed in the second shield member 80. However, this is not a limitation. In addition to the first shield portion 45, the second shield portion 82*b*, and the third shield portion 83*b*, each of the shield portions, including the fourth shield portion 82*a*, the fifth shield portion 83*a*, and the outer-peripheral-side shield portion 84*a* may be formed in either one of the first shield member 40 and the second shield member 80. For example, all shield portions may be formed in only the second shield member 80. Each shield portion may be formed in a state in which the shield portion is divided between the first shield member 40 and the second shield member 80.

In the above embodiment, for example, it has been described that the third shield portion 83*b* is disposed directly below the first contacting portion 34*a* and the second contacting portion 74*a*, which are in contact with each other, as illustrated in FIG. 15 and other figures. However, this is not a limitation. For example, the third shield portion 83*b* may be disposed at a position that is displaced in the left-right direction with respect to the first contacting portion 34*a* and the second contacting portion 74*a*, which are in contact with each other.

In the above embodiment, it has been described that the second shield member 80 includes the fourth shield portion 82*a* that is disposed on each of two sides with respect to the first contacting portion 34*a* and the second contacting portion 74*a*, which are in contact with each other. However, this is not a limitation. The second shield member 80 may have the fourth shield portion 82*a* only on one side or need not have the fourth shield portion 82*a*, as long as a good noise shielding effect can be obtained.

Figure 16:
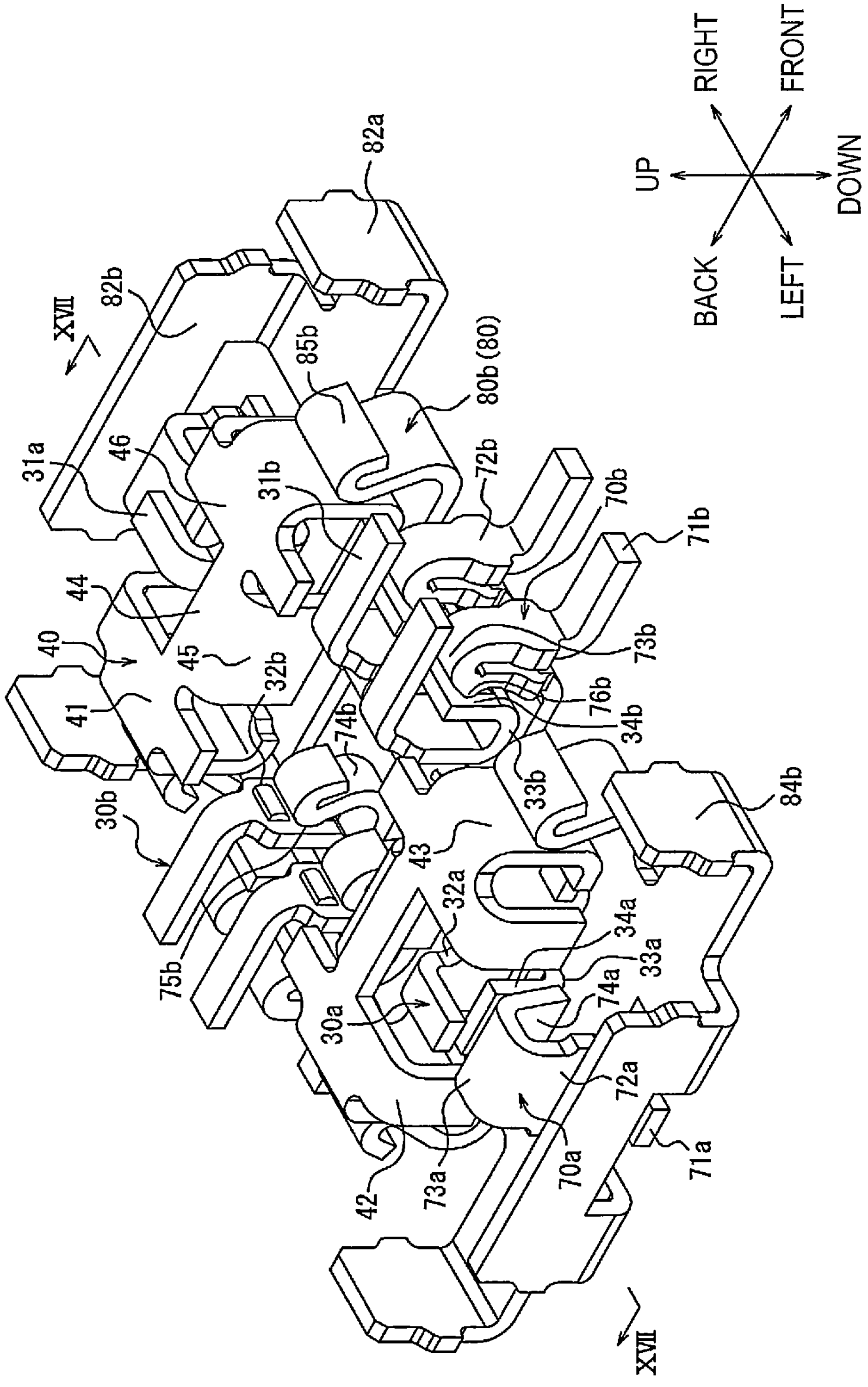
FIG. 16 is a perspective view, corresponding to FIG. 14, of a modification of the connector of FIG. 1 in a state in which only the first insulator and the second insulator are not illustrated.
Figure 17:
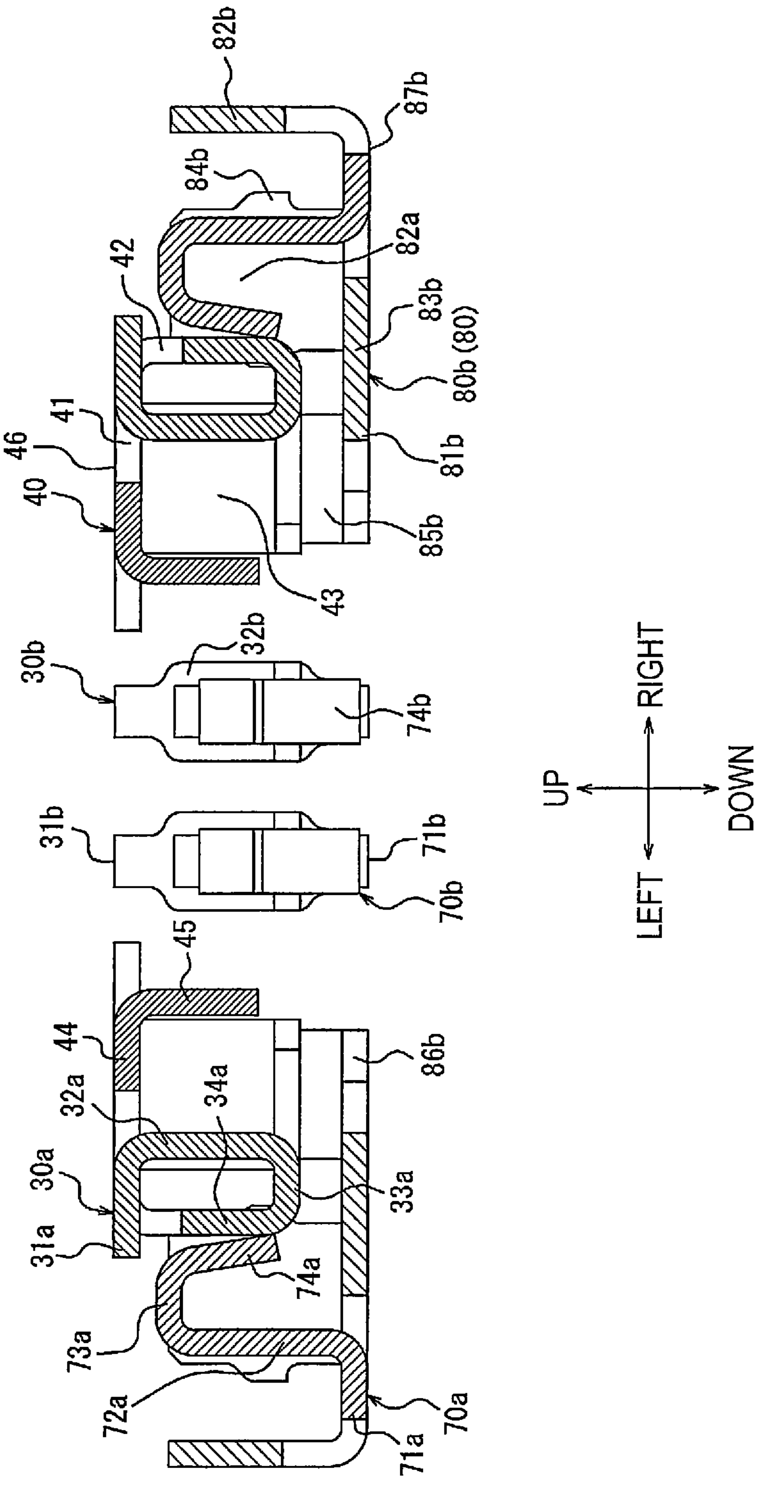
FIG. 17 is a sectional view taken along an arrow XVII-XVII of FIG. 16.

FIG. 16 is a perspective view, corresponding to FIG. 14, of a modification of the connector 1 of FIG. 1 in a state in which only the first insulator 20 and the second insulator 60 are not illustrated. FIG. 17 is a sectional view taken along an arrow XVII-XVII of FIG. 16. In the modification of the connector 1 illustrated in FIGS. 16 and 17, the second shield member 80 has only the second member 80*b* without having the first member 80*a*.

In the above embodiment, it has been described that the second shield member 80 includes the fifth shield portion 83*a*. However, this is not a limitation. For example, as illustrated in FIGS. 16 and 17, the second shield member 80 need not include the fifth shield portion 83*a* as long as a good noise shielding effect can be obtained.

In the above embodiment, it has been described that the second shield member 80 has the outer-peripheral-side shield portion 84*a*. However, this is not a limitation. For example, as illustrated in FIGS. 16 and 17, the second shield member 80 need not have the outer-peripheral-side shield portion 84*a*, as long as a good noise shielding effect can be obtained.

In the above embodiment, it has been described that the shield member includes the first shield portion 45, the second shield portion 82*b*, the third shield portion 83*b*, the fourth shield portion 82*a*, and the fifth shield portion 83*a*. However, this is not a limitation. For example, the shield member may include, in addition to the first shield portion 45 to the fifth shield portion 83*a*, a sixth shield portion that is disposed on a side opposite to the third shield portion 83*b* in the up-down direction with respect to the first contacting portion 34*a* and the second contacting portion 74*a*, which are in contact with each other. For example, the sixth shield portion may be formed in either one of the first shield member 40 and the second shield member 80. Thus, the sixth shield portion shields the first contacting portion 34*a* and the second contacting portion 74*a*, which are in contact with each other, from above. Accordingly, the noise shielding effect is further improved, because the first shield portion 45 to the fifth shield portion 83*a* and the sixth shield portion shield the first contacting portion 34*a* and the second contacting portion 74*a*, which are in contact with each other, from six directions, which are the front-back, left-right, and up-down directions.

In the above embodiment, it has been described that the first extending portion 42 of the first shield member 40 and the contacting portion 85*a* of the second shield member 80 are in contact with each other on each of two sides, in the front-back direction, with respect to the contact part between the first contact 30*a* and the second contact 70*a*. However, this is not a limitation. For example, as illustrated in FIG. 16, as long as good transmission characteristics can be obtained, the second shield member 80 need not have the contacting portion 85*a*, and only the first extending portion 42 of the first shield member 40 may be formed on each of two sides with respect to the contact part between the first contact 30*a* and the second contact 70*a*.

In the above embodiment, it has been described that the first base portion 41 and the first extending portion 42 are formed in the first shield member 40. However, this is not a limitation. Each of constituent portions including the first base portion 41 and the first extending portion 42 may be formed in either one of the first shield member 40 and the second shield member 80. Each of the constituent portions may be formed in a state of being divided between the first shield member 40 and the second shield member 80.

In the above embodiment, it has been described that the two pairs of second extending portions 43 and contacting portions 85*b* are symmetrically disposed on both sides, in the front-back direction, with respect to the contact part between the first contact 30*a* and the second contact 70*a*. However, this is not a limitation. As long as good transmission characteristics can be obtained, the two pairs of second extending portions 43 and contacting portions 85*b* may be asymmetrically disposed.

In the above embodiment, it has been described that the two pairs of first extending portions 42 and contacting portions 85*a* are symmetrically disposed on both sides, in the front-back direction, with respect to the contact part between the first contact 30*a* and the second contact 70*a*. However, this is not a limitation. As long as good transmission characteristics can be obtained, the two pairs of first extending portions 42 and contacting portions 85*a* may be asymmetrically disposed.

In the above embodiment, it has been described that the contacting portion 85*b* of the second shield member 80 extends between the first mount portion 86*b* and the second contact 70*a* along the left-right direction. However, this is not a limitation. For example, the contacting portion 85*b* of the second shield member 80 may extend along any direction.

In the above embodiment, it has been described that the width of the contacting portion 85*b* of the second shield member 80 in the left-right direction is greater than or equal to the mount width of the first mount portion 86*b* in the left-right direction. However, this is not a limitation. For example, the width of the contacting portion 85*b* in the left-right direction may be smaller than the mount width of the first mount portion 86*b* in the left-right direction.

In the above embodiment, it has been described that the contacting portion 85*b* of the second shield member 80 extends in an S-shape from the first mount portion 86*b*. However, this is not a limitation. The contacting portion 85*b* may extend in any shape from the first mount portion 86*b*.

In the above embodiment, it has been described that the contacting portion 85*b* of the second shield member 80 has spring elasticity. However, this is not a limitation. The contacting portion 85*b* need not have spring elasticity. Instead, the second extending portion 43, which is in contact with the contacting portion 85*b*, may have spring elasticity.

In the above embodiment, it has been described that the first contact 30*a* and the second contact 70*a* are disposed along the transversal direction of the connector 1. However, this is not a limitation. The first contact 30*a* and the second contact 70*a* may be disposed along the longitudinal direction of the connector 1. It has been described that the pair of first contacts 30*a* are disposed at both ends of the first insulator 20 in the left-right direction and the pair of second contacts 70*a* are disposed at both ends of the second insulator 60 in the left-right direction. However, this is not a limitation. For example, the pair of first contacts 30*a* may be disposed inside of the first insulator 20 in the left-right direction, and the pair of second contacts 70*a* may be disposed inside of the second insulator 60 in the left-right direction.

In the above embodiment, it has been described that the connector 1 includes a plurality of contacts that differ from the first contact 30*a* and the second contact 70*a*, that is, the signal contact 30*b* and the signal contact 70*b*. However, this is not a limitation. The connector 1 need not have the signal contact 30*b* and the signal contact 70*b*. In the above embodiment, it has been described that the plurality of contacts are disposed along the longitudinal direction of the connector 1. However, this is not a limitation. The plurality of contacts may be disposed along the transversal direction of the connector 1.

In the above embodiment, it has been described that the second shield member 80 includes the first member 80*a* and the second member 80*b*. However, this is not a limitation. The second shield member 80 may be integrally formed as a single member without being divided into two members.

The mount pattern of each mount portion in the above embodiment is not limited to what has been described above. Each mount portion may have any mount pattern formed on the mount surface of a corresponding circuit board.

The connector 1 is mounted in an electronic apparatus including the circuit board CB1 and the circuit board CB2. Examples of the electronic apparatus include any communication terminal device such as a smartphone; and any information processing machine such as a personal computer, a copier, a printer, a facsimile, and a multifunctional machine. In addition, examples of the electronic apparatus include any industrial equipment.

Such an electronic component can obtain good transmission characteristics for high-frequency signals in the connector 1. Such an electronic apparatus has good transmission characteristics in signal transmission. Accordingly, reliability of the electronic apparatus as a product is improved.

REFERENCE SIGNS LIST

1 connector
10 first connector
20 first insulator
21 bottom plate portion
22 outer peripheral wall
22*a* transversal wall
22*b* longitudinal wall
23 fitting recess
24*a* first-contact holding groove
24*b* signal-contact holding groove
25 first-shield-member holding groove
30*a* first contact
30*b* signal contact
31*a* mount portion
31*b* mount portion
32*a* connection portion
32*b* contacting portion
33*a* curved portion
33*b* curved portion
34*a* first contacting portion
34*b* contacting portion
35*b* projection
40 first shield member
41 first base portion
42 first extending portion
43 second extending portion
44 coupling portion
45 first shield portion
46 mount portion
50 second connector
60 second insulator
61 bottom plate portion
62 outer peripheral wall
62*a* transversal wall
62*b* longitudinal wall

63 fitting raised portion
64*a* second-contact holding groove
64*b* signal-contact holding groove
65 second-shield-member holding groove
70*a* second contact
70*b* signal contact
71*a* mount portion
71*b* mount portion
72*a* latch portion
72*b* latch portion
73*a* curved portion
73*b* curved portion
74*a* second contacting portion
74*b* elastic contacting portion
75*b* contacting portion
76*b* contacting portion
80 second shield member
80*a* first member
80*b* second member
81*a* third base portion
81*b* second base portion
82*a* fourth shield portion
82*b* second shield portion
83*a* fifth shield portion
83*b* third shield portion
84*a* outer-peripheral-side shield portion
84*b* latch portion
85*a* contacting portion (second contacting portion)
85*b* contacting portion (first contacting portion)
86*a* latch portion
86*b* first mount portion
87*a* first mount portion
87*b* second mount portion
88*a* second mount portion
89*a* third mount portion
CB1 circuit board
CB2 circuit board

The invention claimed is:

1. A connector comprising:

a first connector including a first insulator and a first contact that is attached to the first insulator;

a second connector including a second insulator that is fittable to the first insulator, and a second contact that is attached to the second insulator and that is in contact with the first contact in a fitted state in which the first insulator and the second insulator are fitted to each other; and a shield member that is attached to the first insulator and the second insulator, wherein the shield member includes a first base portion, and a first extending portion that extends from the first base portion along a fitting direction in which the first insulator and the second insulator are fitted to each other and that is disposed on each of two sides, in a first direction, with respect to a contact part between the first contact and the second contact in the fitted state, the first direction being perpendicular to the fitting direction, wherein the shield member includes a first shield member that is attached to the first insulator, and a second shield member that is attached to the second insulator, and wherein the first base portion and the first extending portion are formed in the first shield member, and wherein the second shield member includes:

a third base portion that is disposed on a same side as the first base portion in the fitting direction, and a second contacting portion that extends from the third base portion along the fitting direction and that is disposed on each of two sides with respect to the second contact in the first direction, and wherein the first extending portion and the second contacting portion are in contact with each other in the fitted state.

2. The connector according to claim 1, wherein the first shield member includes a second extending portion that extends along the fitting direction from each of a pair of edges, along a second direction, of the first base portion, the second direction being perpendicular to the first direction and the fitting direction, wherein the second shield member includes a second base portion that is disposed on a side opposite to the first base portion in the fitting direction, and a first contacting portion that extends along the fitting direction from each of a pair of edges, along the second direction, of the second base portion, and wherein the second extending portion and the first contacting portion are in contact with each other in the fitted state.

3. The connector according to claim 2, wherein two pairs of the second extending portions and the first contacting portions are symmetrically disposed on both sides with respect to the contact part in the first direction.

4. The connector according to claim 1, wherein two pairs of the first extending portions and the second contacting portions are symmetrically disposed on both sides with respect to the contact part in the first direction.

5. The connector according to claim 1, wherein the first direction is a transversal direction of the connector, and wherein the first contact and the second contact are disposed along the transversal direction of the connector.

6. An electronic apparatus comprising the connector according to claim 1.

* * * * *